US008648859B2

(12) United States Patent
Toyoda et al.

(10) Patent No.: US 8,648,859 B2
(45) Date of Patent: Feb. 11, 2014

(54) IMAGE DISPLAY APPARATUS, IMAGE PROCESSING APPARATUS AND METHOD TO OUTPUT AN IMAGE WITH HIGH PERCEIVED RESOLUTION

(75) Inventors: Yoshitaka Toyoda, Tokyo (JP); Shotaro Moriya, Tokyo (JP); Noritaka Okuda, Tokyo (JP); Satoshi Yamanaka, Tokyo (JP); Koji Minami, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 782 days.

(21) Appl. No.: 12/747,837

(22) PCT Filed: Dec. 16, 2009

(86) PCT No.: PCT/JP2009/006914
§ 371 (c)(1),
(2), (4) Date: Jun. 11, 2010

(87) PCT Pub. No.: WO2010/084549
PCT Pub. Date: Jul. 29, 2010

(65) Prior Publication Data
US 2011/0050701 A1 Mar. 3, 2011

(30) Foreign Application Priority Data
Jan. 22, 2009 (JP) .................... 2009-011745

(51) Int. Cl.
*G06T 17/00* (2006.01)
(52) U.S. Cl.
USPC ...................................... 345/428
(58) Field of Classification Search
USPC ...................................... 345/428
See application file for complete search history.

(56) References Cited

U.S. PATENT DOCUMENTS

| 5,430,497 A | 7/1995 | Strolle et al. |
| 5,717,789 A | 2/1998 | Anderson et al. |

(Continued)

FOREIGN PATENT DOCUMENTS

| JP | 4-92576 A | 3/1992 |
| JP | 7-177386 A | 7/1995 |

(Continued)

OTHER PUBLICATIONS

Greenspan et al., "Image Enhancement by Nonlinear Extrapolation in Frequency Space", IEEE Transactions of Image Processing, vol. 9, No. 6, Jun. 2000, pp. 1035-1048.

(Continued)

*Primary Examiner* — Aaron M Richer
*Assistant Examiner* — Vu Nguyen
(74) *Attorney, Agent, or Firm* — Birch, Stewart, Kolasch & Birch, LLP

(57) ABSTRACT

An intermediate image generating means (1) generates a horizontal intermediate image (D1$h$) and a vertical intermediate image (D1$v$) by extracting components of an input image (DIN) in a particular frequency band; an intermediate image processing means (2) generates a horizontal image (D2B$h$) and a vertical image (D2B$v$) by performing non-linear processing (2A) and high-frequency component generation (2B); an intermediate image (D2) is obtained by combining these horizontal and vertical images by performing weighted addition for each pixel and is added (3) to the input image (DIN) to obtain an enhanced output image (DOUT). Even if the input image includes a fold-over component on the high-frequency side or does not include an adequate high-frequency component, adequate image enhancement processing can be carried out.

13 Claims, 23 Drawing Sheets

(56) References Cited

U.S. PATENT DOCUMENTS

| | | |
|---|---|---|
| 6,005,983 A | 12/1999 | Anderson et al. |
| 2004/0135798 A1* | 7/2004 | Someya et al. ............... 345/690 |
| 2005/0100240 A1 | 5/2005 | Ikeda et al. |
| 2006/0045375 A1 | 3/2006 | Okuno et al. |
| 2009/0002562 A1 | 1/2009 | Yokoyama et al. |
| 2009/0232401 A1 | 9/2009 | Yamashita et al. |

FOREIGN PATENT DOCUMENTS

| | | |
|---|---|---|
| JP | 8-111792 A | 4/1996 |
| JP | 8-204995 A | 8/1996 |
| JP | 9-44651 A | 2/1997 |
| JP | 9-46576 A | 2/1997 |
| JP | 11-75205 A | 3/1999 |
| JP | 2002-325186 A | 11/2002 |
| JP | 2005-142832 A | 6/2005 |
| JP | 2006-340006 A | 12/2006 |
| JP | 2007-110303 A | 4/2007 |
| JP | 2008-125112 A | 5/2008 |
| JP | 2008-176447 A | 7/2008 |
| JP | 2008-252767 A | 10/2008 |
| WO | WO 02/054778 A1 | 7/2002 |
| WO | WO 2004/057534 A1 | 7/2004 |

OTHER PUBLICATIONS

Greenspan et al. "Image enhancement by non-linear extrapolation in frequency space", Proceedings of the IS&T/SPIE Symposiun on Electric Imaging Science and Technology-Image and Video Processing II, vol. 2185. pp. 2-23, Feb. 1994.

Shimura et al., "A Digital Image Enlarging Method without Edge Effect by Using the e-Filter", Technical Report of IEICE, vol. J86-A, No. 5, pp. 540-551, Mar. 1, 2003.

Yasumasa Takahashi et al., "An enlargement method of digital images based on Laplacian pyramid representation", Electronics and Communications in Japan, Part 2, vol. 84, No. 6, Jun. 1, 2001, pp. 40-49.

Yasumasa Takahashi et al., "An enlargement method of digital images with the prediction of high-frequencey components", 2002 IEEE International conference on acoustics, speech, and signal processing, May 13-17, 2002, pp. IV-3700-IV-3703.

* cited by examiner

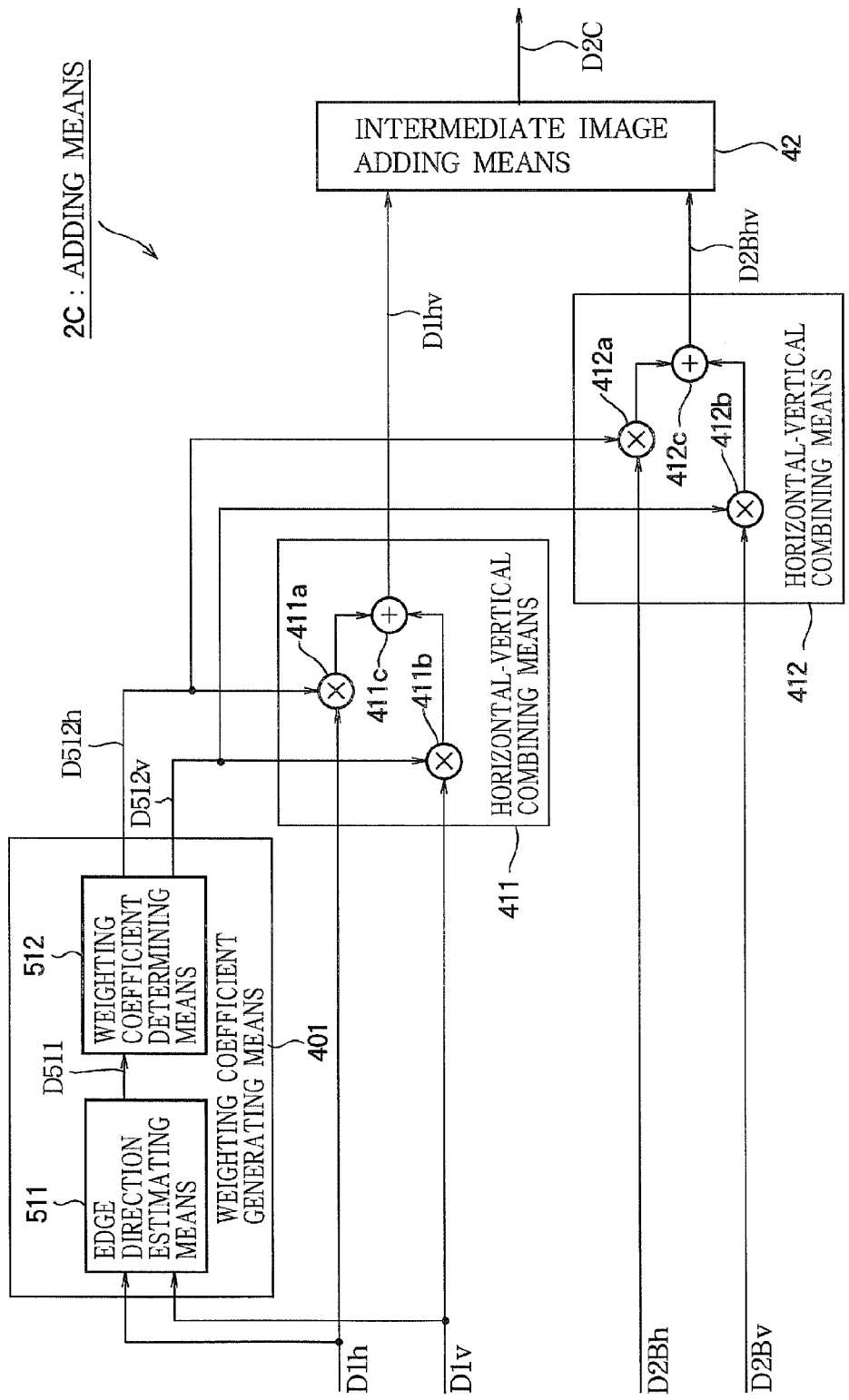

FIG.8(A)

| A11 | A21 | A31 | A41 |
|---|---|---|---|
| A12 | A22 | A32 | A42 |
| A13 | A23 | A33 | A43 |
| A14 | A24 | A34 | A44 |

FIG.8(B)

| A11 | 0 | A21 | 0 | A31 | 0 | A41 | 0 |
|---|---|---|---|---|---|---|---|
| A12 | 0 | A22 | 0 | A32 | 0 | A42 | 0 |
| A13 | 0 | A23 | 0 | A33 | 0 | A43 | 0 |
| A14 | 0 | A24 | 0 | A34 | 0 | A44 | 0 |

FIG.8(C)

| B11 | B21 | B31 | B41 | B51 | B61 | B71 | B81 |
|---|---|---|---|---|---|---|---|
| B12 | B22 | B32 | B42 | B52 | B62 | B72 | B82 |
| B13 | B23 | B33 | B43 | B53 | B63 | B73 | B83 |
| B14 | B24 | B34 | B44 | B53 | B64 | B74 | B84 |

FIG.8(D)

| B11 | B21 | B31 | B41 | B51 | B61 | B71 | B81 |
|---|---|---|---|---|---|---|---|
| 0 | 0 | 0 | 0 | 0 | 0 | 0 | 0 |
| B12 | B22 | B32 | B42 | B52 | B62 | B72 | B82 |
| 0 | 0 | 0 | 0 | 0 | 0 | 0 | 0 |
| B13 | B23 | B33 | B43 | B53 | B63 | B73 | B83 |
| 0 | 0 | 0 | 0 | 0 | 0 | 0 | 0 |
| B14 | B24 | B34 | B44 | B53 | B64 | B74 | B84 |
| 0 | 0 | 0 | 0 | 0 | 0 | 0 | 0 |

FIG.8(E)

| C11 | C21 | C31 | C41 | C51 | C61 | C71 | C81 |
|---|---|---|---|---|---|---|---|
| C12 | C22 | C32 | C42 | C52 | C62 | C72 | C82 |
| C13 | C23 | C33 | C43 | C53 | C63 | C73 | C83 |
| C14 | C24 | C34 | C44 | C54 | C64 | C74 | C84 |
| C15 | C25 | C35 | C45 | C55 | C65 | C75 | C85 |
| C16 | C26 | C36 | C46 | C56 | C66 | C76 | C86 |
| C17 | C27 | C37 | C47 | C57 | C67 | C77 | C87 |
| C18 | C28 | C38 | C48 | C58 | C68 | C78 | C88 |

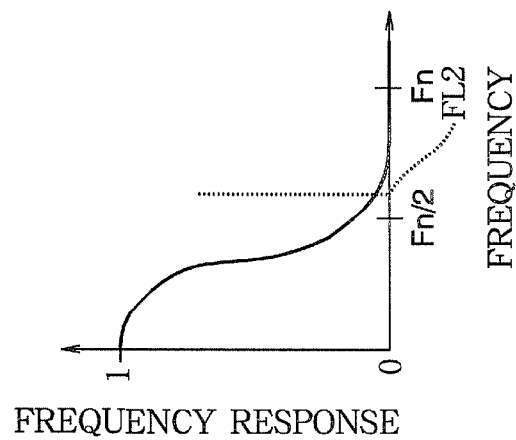
FIG.10(A) FREQUENCY SPECTRUM OF INPUT IMAGE DIN
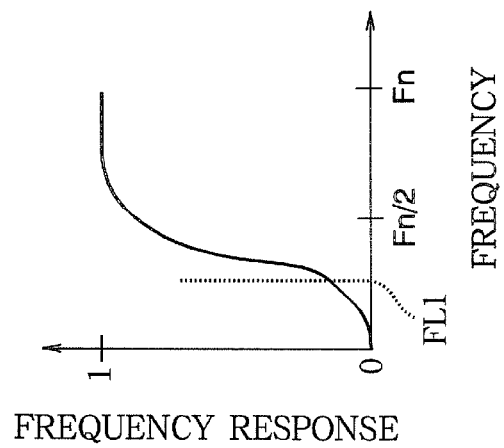
FIG.10(B) FREQUENCY RESPONSE OF HIGH-FREQUENCY COMPONENT IMAGE GENERATING MEANS 1A
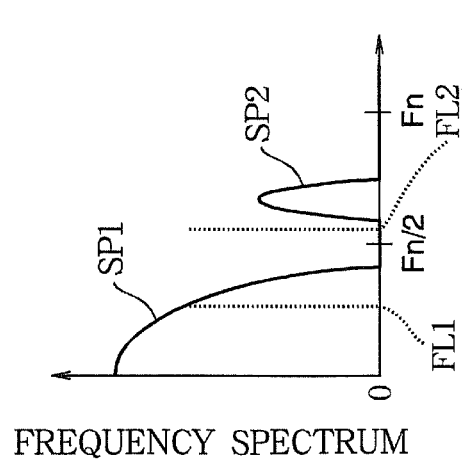
FIG.10(C) FREQUENCY RESPONSE OF LOW-FREQUENCY COMPONENT IMAGE GENERATING MEANS 1B

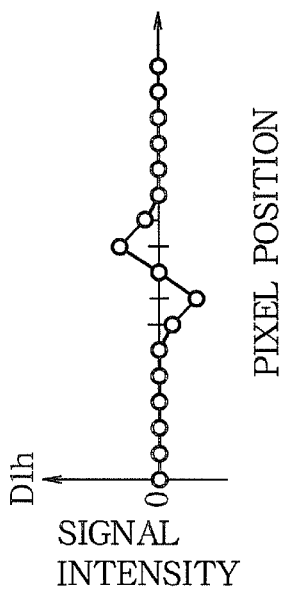
FIG.15 (D)
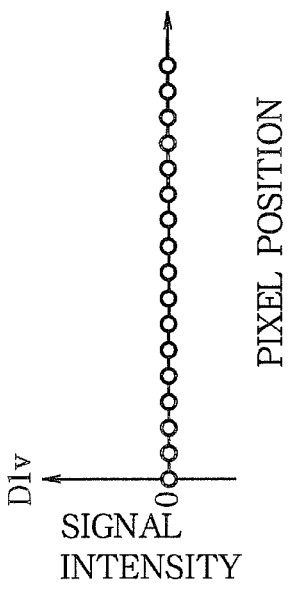
FIG.15 (E)
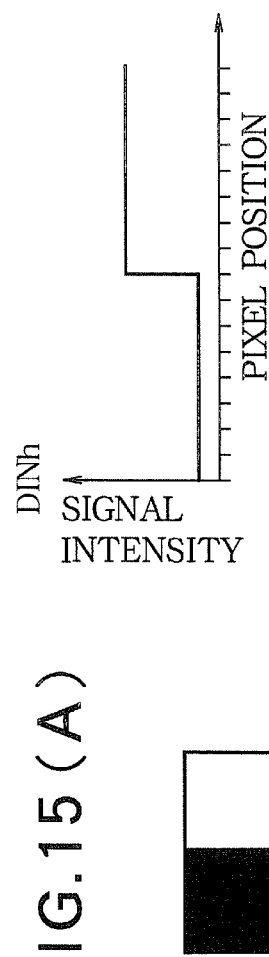
FIG.15 (B)
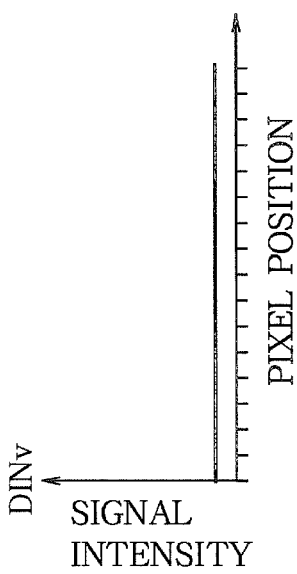
FIG.15 (C)
FIG.15 (A)

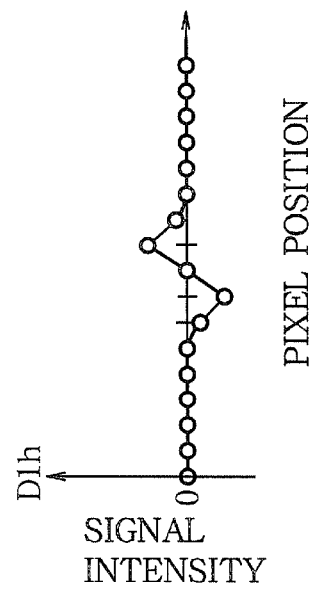
FIG.16(D)
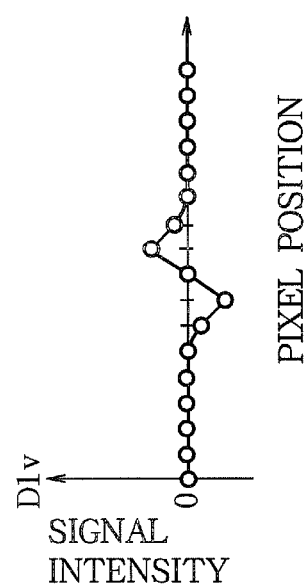
FIG.16(E)
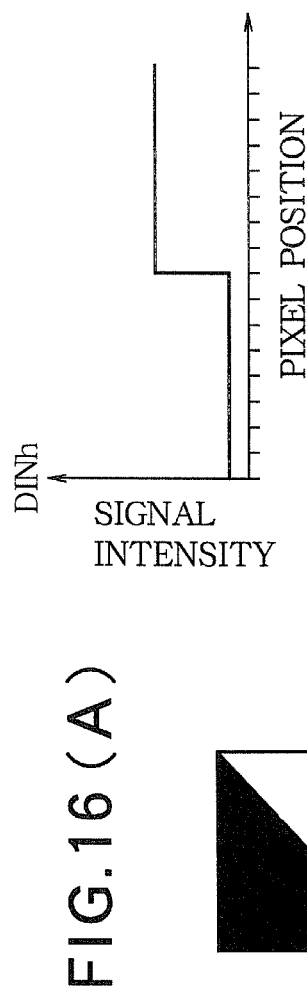
FIG.16(B)
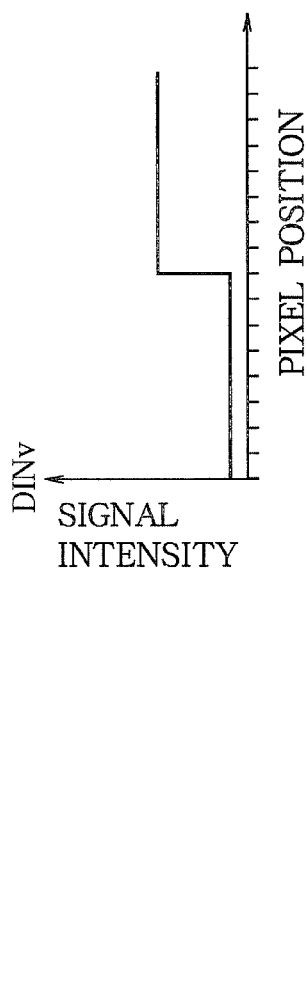
FIG.16(C)
FIG.16(A)

IMAGE DISPLAY APPARATUS, IMAGE PROCESSING APPARATUS AND METHOD TO OUTPUT AN IMAGE WITH HIGH PERCEIVED RESOLUTION

FIELD OF THE INVENTION

The present invention relates to an image processing apparatus and an image processing method that enhance an input image by, for example, generating and adding high frequency components to an enlarged input image that is an enlargement of an original image, in order to obtain an output image with high perceived resolution, and to an image display apparatus using this image processing apparatus and method.

BACKGROUND ART

Images are generally reproduced and displayed after image signals representing the image have been subjected to appropriate image processing.

In the image processing apparatus disclosed in patent document 1, for example, following multiresolution decomposition, a desired frequency band is enhanced by specifying an enhancement coefficient for the image in the desired frequency band according to the image signal in a lower frequency band.

PRIOR ART REFERENCES

Patent Documents

Patent document 1: Japanese Patent Application Publication No. H9-44651 (Paragraph No. 0009)

SUMMARY OF THE INVENTION

Problems to be Solved by the Invention

In the image processing apparatus in which an appropriate enhancement coefficient is specified for the image in a desired frequency band of the decomposed multiresolution image, for some input images the enhancement processing is inappropriate or inadequate and output images with proper picture quality cannot be obtained.

If an image that has been subjected to enlargement processing is input as an input image, for example, part of the frequency spectrum of the image before the enlargement processing folds over and appears as a fold-over component on the high-frequency side of the frequency spectrum of the input image. Simply enhancing the high frequency component is then inappropriate, because the fold-over component is enhanced. If the frequency band is limited so as to enhance only a frequency band excluding the fold-over component, however, then enhancement of the high-frequency side of the frequency spectrum must be avoided, and in consequence, the enhancement processing is inadequate.

If a noise-suppressed image is input as an input image, the high-frequency side of the frequency spectrum has been eliminated by noise suppression. Attempts to extract the high-frequency component therefore fail, which may make it impossible to carry out adequate image enhancement processing.

An object of the present invention is to provide an image processing apparatus and an image processing method that can enhance an input image adequately even if the image includes a fold-over component on the high-frequency side of its frequency spectrum or does not include an adequate high-frequency component.

Means of Solution of the Problems

The image processing apparatus of the invention includes:
an intermediate image generating means for generating a first horizontal intermediate image by extracting a horizontal component in a particular frequency band in an input image and a first vertical intermediate image by extracting a vertical component in a particular frequency band in the input image;
an intermediate image processing means for generating a second intermediate image from the first horizontal intermediate image and the first vertical intermediate image; and
a first adding means for adding the input image and the second intermediate image; wherein
the intermediate processing means includes
a horizontal non-linear processing means with processing content that varies from pixel to pixel in the first horizontal intermediate image, and
a vertical non-linear processing means with processing content that varies from pixel to pixel in the first vertical intermediate image; and wherein
the intermediate image processing means has
a second adding means for adding
the first horizontal intermediate image,
the first vertical intermediate image,
a second horizontal intermediate image obtained by processing an output of the horizontal non-linear processing means, and
a second vertical intermediate image obtained by processing an output of the vertical non-linear processing means, and
outputting a resulting sum as the second intermediate image; and wherein
the second adding means comprises at least one of
a first horizontal-vertical combining means for combining the first horizontal intermediate image and the first vertical intermediate image by taking a weighted sum thereof, and
a second horizontal-vertical combining means for combining the second horizontal intermediate image and the second vertical intermediate image by taking a weighted sum thereof.

Effect of the Invention

According to the present invention,
adequate image enhancement processing can be carried out, while preventing the occurrence of overshoot, even if the frequency spectrum of the input image includes a fold-over component on the high-frequency side, or does not include adequate high-frequency components. It is also possible to prevent enhancement processing artifacts that depend on the directions of edges included in the input image, without increasing the circuit size.

BRIEF DESCRIPTION OF THE DRAWINGS

FIG. 4 is a block diagram illustrating an exemplary structure of the adding means 2C in FIG. 1.

FIGS. 8(A) to 8(E) are pixel arrangement diagrams illustrating the operation of the image enlarging means U1 in FIG. 6.

FIGS. 10(A) to 10(E) are diagrams showing frequency spectra and frequency responses to illustrate the operation of the intermediate image generating means 1 in FIG. 1.

FIG. 15(A) is a diagram showing a horizontal edge; FIGS. 15(B) to 15(E) are diagrams indicating image signals obtained when the edge direction is horizontal as in FIG. 15(A).

FIG. 16(A) is a diagram showing a diagonal edge; FIGS. 16(B) to 16(E) are diagrams indicating image signals obtained when the edge direction is diagonal as in FIG. 16(A).

MODES FOR CARRYING OUT THE INVENTION

First Embodiment

Figure 1:
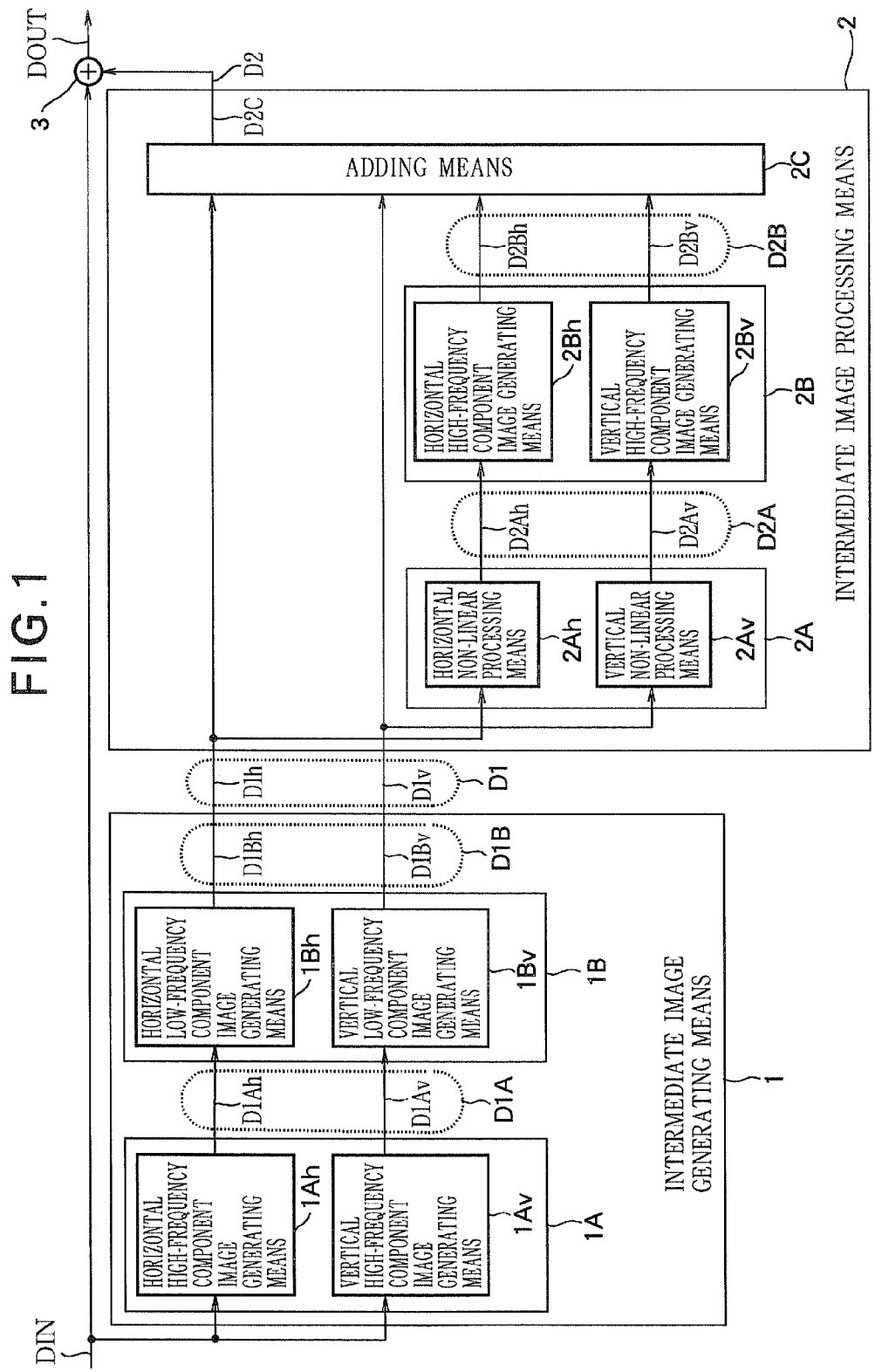
FIG. 1 is a block diagram illustrating the structure of an image processing apparatus according to a first embodiment of the invention.

FIG. 1 is a diagram illustrating an exemplary structure of an image processing apparatus according to the first embodiment of the invention; the illustrated image processing apparatus can be utilized as, for example, part of an image display apparatus.

The illustrated image processing apparatus includes an intermediate image generating means 1, an intermediate image processing means 2, and an adding means 3.

The intermediate image generating means 1 generates an intermediate image D1 (the first intermediate image) by extracting components in a particular frequency band (components from a first frequency (a first predetermined frequency) to a second frequency (a second predetermined frequency)) from an input image DIN.

The intermediate image processing means 2 generates an intermediate image D2 (the second intermediate image) by carrying out certain processing, which will be described later, on intermediate image D1.

The adding means 3 adds the input image DIN and intermediate image D2. The image obtained as the resulting sum by the adding means 3 is output as an output image DOUT.

The intermediate image generating means 1 includes a high-frequency component image generating means 1A for generating an image D1A by extracting only the high frequency component above the first frequency from the input image DIN and a low-frequency component image generating means 1B for generating an image D1B by extracting only the low-frequency component below the second frequency from image D1A. The second frequency is higher than the first frequency and the high-frequency component image generating means 1A and the low-frequency component image generating means 1B form a band-pass filter means for extracting the component in a particular frequency band. Image D1B is output from the intermediate image generating means 1 as intermediate image D1.

The intermediate image processing means 2 includes a non-linear processing means 2A for outputting an image D2A obtained by performing non-linear processing, which will be described later, on intermediate image D1, a high-frequency component image generating means 2B for outputting an image D2B obtained by extracting only the high-frequency component above a third frequency (the third predetermined frequency) from image D2A, and an adding means 2C for outputting an image D2C obtained by adding intermediate image D1 and image D2B. Image D2C is output from the intermediate image processing means 2 as intermediate image D2.

The operation of the image processing apparatus in the first embodiment of the invention will be described in detail below.

First the detailed operation of the intermediate image generating means 1 will be described.

In the intermediate image generating means 1, the high-frequency component image generating means 1A generates image D1A by extracting only the high-frequency component of the input image DIN above the first frequency. The high-frequency component can be extracted by performing high-pass filter processing. The high-frequency component is extracted in the horizontal direction and vertical direction separately. The high-frequency component image generating means 1A includes a horizontal high-frequency component image generating means 1Ah for generating an image D1Ah by performing horizontal high-pass filter processing on the input image DIN to extract only a horizontal high-frequency component above a first horizontal frequency and a vertical high-frequency component image generating means 1Av for generating an image D1Av by performing vertical high-pass filter processing to extract a vertical high-frequency component above a first vertical frequency; image D1A includes image D1Ah and image D1Av.

The signals of the plurality of pixels forming the input image DIN are supplied sequentially, proceeding through a plurality of horizontal lines (rows) from top to bottom, and proceeding from left to right through the plurality of pixels in each horizontal line; on the input side of the vertical high-frequency component image generating means 1Av there is a reordering means (not shown) for cumulatively storing the signals of a plurality of mutually adjacent lines in the input image and supplying pixel signals centered on the pixel to be processed, from a plurality of lines thereabove to a plurality of lines therebelow, in vertical order from top to bottom.

Next, in the intermediate image generating means 1, the low-frequency component image generating means 1B generates an image D1B by extracting only the low-frequency component of image D1A below the second frequency. The low-frequency component can be extracted by performing low-pass filter processing. The low-frequency component is extracted in the horizontal direction and the vertical direction separately. The low-frequency component image generating means 1B includes a horizontal low-frequency component image generating means 1Bh for generating an image D1Bh by performing horizontal low-pass filter processing on image D1Ah to extract a horizontal low-frequency component below a second horizontal frequency and a vertical low-frequency component image generating means 1Bv for generating an image D1Bv by performing vertical low-pass filter processing on image D1Av to extract a vertical low-frequency component below a second vertical frequency; image D1B includes image D1Bh and image D1Bv. Image D1B is output from the intermediate image generating means 1 as intermediate image D1. Intermediate image D1 includes an image D1$h$ (a first horizontal intermediate image) corresponding to image D1Bh and an image D1$v$ (a first vertical intermediate image) corresponding to image D1Bv.

Next the detailed operation of the intermediate image processing means 2 will be described.

In the intermediate image processing means 2, the non-linear processing means 2A generates image D2A by performing non-linear processing, which will be described later, on intermediate image D1. The non-linear processing is performed in the horizontal direction and vertical direction separately. The non-linear processing means 2A includes a horizontal non-linear processing means 2Ah for generating an image D2Ah by performing non-linear processing, which will be described later, on image D1$h$, and a vertical non-linear processing means 2Av for generating an image D2Av by performing non-linear processing, which will be described later, on image D1$v$; image D2A includes image D2Ah and image D2Av.

The operation of the non-linear processing means 2A will now be described in further detail. The horizontal non-linear processing means 2Ah and the vertical non-linear processing means 2Av included in the non-linear processing means 2A have the same structure. The horizontal non-linear processing means 2Ah performs processing in the horizontal direction, and the vertical non-linear processing means 2Av performs processing in the vertical direction.

Figure 2:
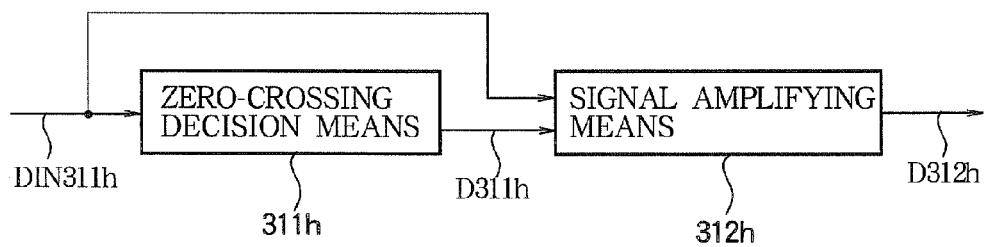
FIG. 2 is a block diagram illustrating an exemplary structure of the horizontal non-linear processing means 2Ah in FIG. 1.

FIG. 2 is a diagram illustrating an exemplary structure of the horizontal non-linear processing means 2Ah. The illustrated horizontal non-linear processing means 2Ah includes a zero-crossing decision means 311$h$ and a signal amplifying means 312$h$. The horizontal non-linear processing means 2Ah receives image D1$h$ as an input image DIN311$h$.

The zero-crossing decision means 311$h$ checks the pixel values in the input image DIN311$h$ for changes in the horizontal direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312$h$ by a signal D311$h$. Preceding and following herein means the preceding and following positions in the sequence in which signals are supplied: the positions to the left and right when the pixel signals are supplied from left to right in the horizontal direction, or the positions above and below when the pixel signals are supplied from top to bottom in the vertical direction. The zero-crossing decision means 311$h$ in the horizontal non-linear processing means 2Ah recognizes the pixels to the left and right of the zero-crossing point as the pixels preceding and following the zero-crossing point.

The signal amplifying means 312$h$ identifies the pixels preceding and following the zero-crossing point (the adjacently preceding and following pixels) in accordance with signal D311$h$ and generates a non-linear image D312$h$ by amplifying the pixel values (increasing the absolute values) of only the pixels preceding and following the zero-crossing point. The amplification factor for the pixel values of the pixels preceding and following the zero-crossing point is a value greater than 1; the amplification factor for the pixel values of other pixels is 1.

The non-linear image D312$h$ is output from the horizontal non-linear processing means 2Ah as image D2Ah.

Figure 3:
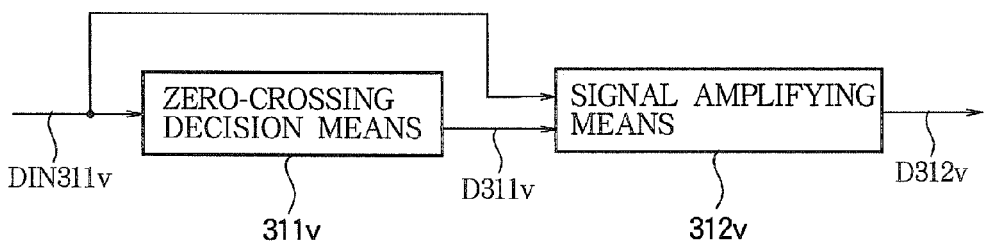
FIG. 3 is a block diagram illustrating an exemplary structure of the vertical non-linear processing means 2Av in FIG. 1.

FIG. 3 is a diagram illustrating an exemplary structure of the vertical non-linear processing means 2Av. The illustrated vertical non-linear processing means 2Av includes a zero-crossing decision means 311$v$ and a signal amplifying means 312$v$. Image D1$v$ is input to the vertical non-linear processing means 2Av as an input image DIN311$v$.

The zero-crossing decision means 311$v$ checks the pixel values in the input image DIN311$v$ for changes in the vertical direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312$v$ by a signal D311$v$. The zero-crossing decision means 311$v$ in the vertical non-linear processing means 2Av recognizes the pixels above and below the zero-crossing point as the pixels preceding and following the zero-crossing point.

The signal amplifying means 312$v$ identifies the pixels preceding and following the zero-crossing point (the adjacently preceding and following pixels) from signal D311$v$ and generates a non-linear image D312$v$ by amplifying only the pixel values (increasing the absolute values) of the pixels preceding and following the zero-crossing point. The amplification factor for the pixel values of the pixels preceding and following the zero-crossing point is a value greater than 1, and the amplification factor for the pixel values of other pixels is 1.

The non-linear processing means 2A operates as described above.

Next, in the intermediate image processing means 2, the high-frequency component image generating means 2B generates image D2B by extracting only the high-frequency component of image D2A above the third frequency. The high-frequency component can be extracted by performing high-pass filter processing. The high-frequency component of the image is extracted in the horizontal direction and the vertical direction separately. The high-frequency component image generating means 2B includes a horizontal high-frequency component image generating means 2Bh for generating an image D2Bh by performing horizontal high-pass filter processing on image D2Ah to extract a horizontal high-frequency component above a third horizontal frequency and a vertical high-frequency component image generating means 2Bv for generating an image D2Bv by performing vertical high-pass filter processing on image D2Av to extract a vertical high-frequency component above a third vertical frequency; image D2B includes image D2Bh and image D2Bv. Image D2B is output from the intermediate image processing means 2 as intermediate image D2. Intermediate image D2 includes an image D2h corresponding to image D2Bh and an image D2v corresponding to image D2Bv.

Next, adding means 2C adds intermediate image D1 and image D2B to generate image D2C. Intermediate image D1 includes image D1h and image D1v and intermediate image D2B includes image D2Bh and image D2Bv, so to add intermediate image D1 and image D2B means to add all the above images D1h, D1v, D2Bh, and D2Bv. The operation of adding means 2C will be described in detail below.

What adding means 2C adds are the values of the same pixel in images D1h, D1v, D2Bh, and D2Bv; if there are differences in the time required for these images to be processed in the interval from the provision of the input image DIN up to their input to adding means 2C (if there is a difference between the time required for horizontal processing and vertical processing, etc.), a delay means or the like (not shown) is provided on the input side of adding means 2C for timing alignment.

FIG. 4 is a drawing illustrating an exemplary structure of adding means 2C. The illustrated adding means 2C includes a weighting coefficient generating means 401, a horizontal-vertical combining means 411, and horizontal-vertical combining means 412.

From image D1h and image D1v the weighting coefficient generating means 401 determines a weighting coefficient D512h for the horizontal component and a weighting coefficient D512v for the vertical component by an operation that will be described later. The sum of weighting coefficient D512h and weighting coefficient D512v is always constant, for example, '1'.

Horizontal-vertical combining means 411 calculates a weighted sum of image D1h and image D1v according to the weighting coefficients D512h and D512v obtained by the weighting coefficient generating means 401 and outputs an image D1hv in which the horizontal component and vertical component are combined.

Horizontal-vertical combining means 412 similarly calculates a weighted sum of image D2Bh and image D2Bv according to the weighting coefficients D512h and D512v obtained by the weighting coefficient generating means 401 and outputs an image D2Bhv in which the horizontal component and vertical component are combined.

An intermediate image adding means 42 adds image D1hv and image D2Bhv and outputs image D2C.

The operation of the weighting coefficient generating means 401 will now be described in further detail. The weighting coefficient generating means 401 includes an edge direction estimating means 511 and a weighting coefficient determining means 512.

From the two signals of image D1h and image D1v, the edge direction estimating means 511 calculates an edge direction estimation quantity D511 as a quantity corresponding to an edge direction (angle). If absolute values in image D1h are denoted dH and absolute values in image D1v are denoted dV, for example, the differences (dH−dV) between the two values are output as the edge direction estimation quantity D511.

Figure 5A:
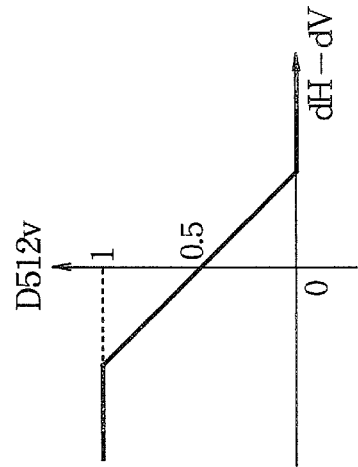
FIGS. 5(A) and 5(B) are line graphs illustrating relationships between differences (dH−dV) between absolute values in images D1h and D1v and weighting coefficients D512h and D512v.
Figure 5B:
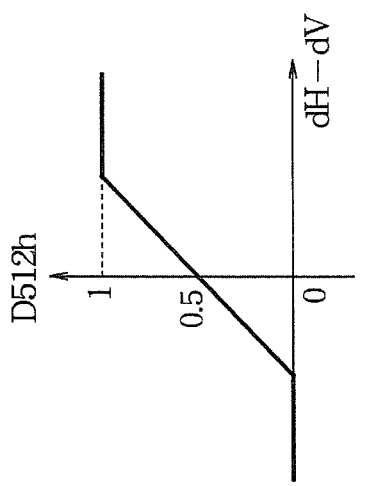

From the edge direction estimation quantity D511, the weighting coefficient determining means 512 determines the weighting coefficient D512h for the horizontal component and the weighting coefficient D512v for the vertical component. FIGS. 5(A) and 5(B) are diagrams illustrating an exemplary method of determining the weighting coefficients D512h and D512v corresponding to the above difference (dH−dV). In the examples shown in FIGS. 5(A) and 5(B), weighting coefficient D512h is calculated as:

$$D512h=0.5+K\alpha(dH-dV) \tag{1a}$$

and weighting coefficient D512v is calculated as:

$$D512v=1-D512h=0.5-K\alpha(dH-dV) \tag{1b}$$

where $K\alpha$ is a positive constant representing the slope of the lines in FIGS. 5(A) and 5(B) (accordingly, the ratio of the change in D512h and D512v to the increase in (dH−dV)); if the results of the above calculations are less than '0', they are set to '0', and if they are greater than '1', they are set to '1'.

The weighting coefficient generating means 401 operates as described above.

The horizontal-vertical combining means 411 includes a first multiplying means 411a and a second multiplying means 411b. In the horizontal-vertical combining means 411, the first multiplying means 411a multiplies image D1h by weighting coefficient D512h, and the second multiplying means 411b multiplies image D1v by weighting coefficient D512v. An adding means 411c adds these products and outputs image D1hv.

The horizontal-vertical combining means 412 includes a first multiplying means 412a and a second multiplying means 412b. In the horizontal-vertical combining means 412, the first multiplying means 412a multiplies image D2Bh by weighting coefficient D512h, and the second multiplying means 412b multiplies image D2Bv by weighting coefficient D512v. An adding means 412c adds these products and outputs image D2Bhv.

The weighting coefficients D512h and D512v are calculated for each pixel in images D1h and D1v, which means that the mixing ratio of the horizontal and vertical components in the output image D2C from the b2C is varied depending on the pixel position. The effect by performing this weighting will be described later.

Next, the intermediate image adding means 42 adds image D1hv and image D2Bhv and outputs image D2C. The adding process in the intermediate image adding means 42 may be weighted addition instead of simple addition. That is, image D1hv and image D2Bhv may be amplified by mutually differing amplification factors and then added.

Adding means 2C operates as described above.

Finally, the operation of adding means 3 will be described. Adding means 3 generates the output image DOUT by adding the input image DIN and intermediate image D2. The output image DOUT is output as the final output image from the image processing apparatus.

What adding means 3 adds are the values of the same pixel in the input image DIN and intermediate image D2; if there is a difference in the time required for these images to be processed in the interval from the provision of the input image DIN up to their input to adding means 3, a delay means or the like (not shown) is provided on the input side of adding means 3 for timing alignment.

An example in which the image processing apparatus in this embodiment is utilized as part of an image display apparatus will be described below. The description will clarify the effects of the image processing apparatus in this embodiment.

Unless otherwise specified, Fn will denote the Nyquist frequency of the input image DIN.

Figure 6:
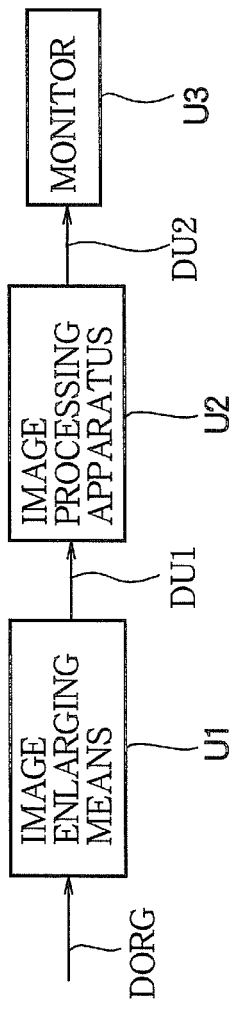
FIG. 6 is a block diagram illustrating an exemplary structure of an image display apparatus utilizing the image processing apparatus according to the present invention.

FIG. 6 illustrates an image display apparatus utilizing the image processing apparatus according to the invention; in the illustrated image display apparatus, an image corresponding to the original image DORG is displayed on a monitor U3.

If the image size of the original image DORG is smaller than the image size of the monitor U3, the image enlarging means U1 outputs an image DU1 obtained by enlarging the original image DORG. The image can be enlarged by the bicubic method, for example.

The image processing apparatus U2 of this invention outputs an image DU2 obtained by performing the processing described above on image DU1. Image DU2 is displayed on the monitor U8.

The operation and effects of the image enlarging means U1 will be described below on the assumption that the number of pixels in the original image DORG is half of the number of pixels in the monitor U3 in both the horizontal and vertical directions.

Figure 7:
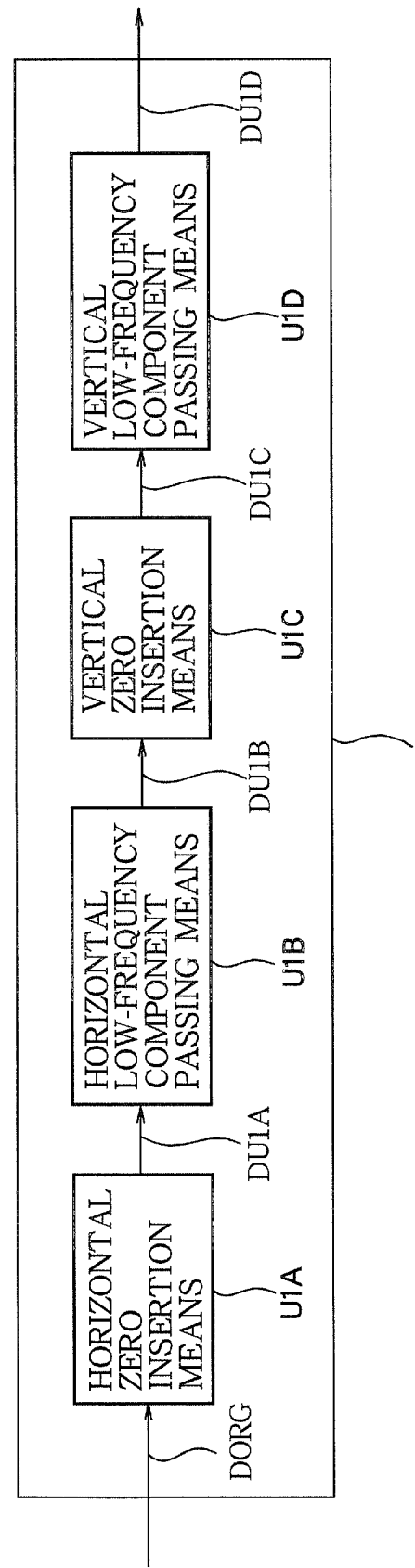
FIG. 7 is a block diagram illustrating an exemplary structure of the image enlarging means U1 in FIG. 6.

FIG. 7 is a diagram illustrating the structure and operation of the image enlarging means U1. The image enlarging means U1 includes a horizontal zero insertion means U1A, a horizontal low-frequency component passing means U1B, a vertical zero insertion means U1C, and a vertical low-frequency component passing means U1D.

The horizontal zero insertion means U1A generates an image DU1A by appropriately inserting pixels having a pixel value of 0 into the original image DORG in the horizontal direction (inserting a column of pixels having pixel values of 0 between each horizontally adjacent pair of pixel columns in the original image DORG).

The horizontal low-frequency component passing means U1B generates an image DU1B by performing low-pass filter processing to extract only a low-frequency component from image DU1A.

The vertical zero insertion means U1C generates an image DU1C by appropriately inserting pixels having a pixel value of 0 into image DU1B in the vertical direction (inserting a row of pixels having pixel values of 0 between each vertically adjacent pair of pixel rows in image DU1B).

The vertical low-frequency component passing means U1D generates an image DU1D by extracting only a low-frequency component from image DU1C.

Image DU1D, which is output from the image enlarging means U1 as image DU1, is an enlargement of the original image DORG by a factor of two in both the horizontal direction and the vertical direction.

FIGS. 8(A) to 8(E) are diagrams illustrating the operation of the image enlarging means U1 in detail: FIG. 8(A) shows the original image DORG; FIG. 8(B) shows image DU1A; FIG. 8(C) shows image DU1B; FIG. 8(D) shows image DU1C; FIG. 8(E) shows image DU1D. In FIGS. 8(A) to 8(E), each box represents a pixel, and the characters or numbers in the box represent the pixel value of the corresponding pixel.

The horizontal zero insertion means U1A generates the image DU1A shown in FIG. 8(B) by inserting a pixel having a pixel value of 0 for each pixel in the original image DORG shown in FIG. 8(A) in the horizontal direction (inserting a column of pixels having pixel values of 0 between each horizontally adjacent pair of pixel columns in the original image DORG). The horizontal low-frequency component passing means U1B generates the image DU1B shown in FIG. 8(C) by performing low-pass filter processing on the image DU1A shown in FIG. 8(B).

The vertical zero insertion means U1C generates the image DU1C shown in FIG. 8(D) by inserting a pixel having a pixel value of 0 for each pixel in image DU1B shown in FIG. 8(C) in the vertical direction (inserting a row of pixels having pixel values of 0 between each vertically adjacent pair of pixel rows in image DU1B). The vertical low-frequency component passing means U1D generates the image DU1D shown in FIG. 8(E) by performing low-pass filter processing on the image DU1C shown in FIG. 8(D). The image DU1D generated by this processing is twice as large as the original image DORG in both the horizontal and vertical directions.

Figure 9A:
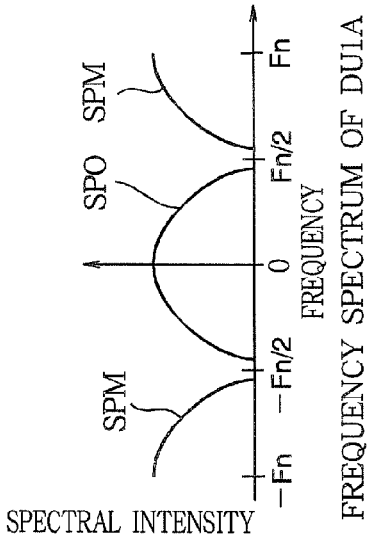
FIGS. 9(A) to 9(D) are diagrams showing frequency spectra and a frequency response to illustrate the operation of the image enlarging means U1 in FIG. 6.
Figure 9B:
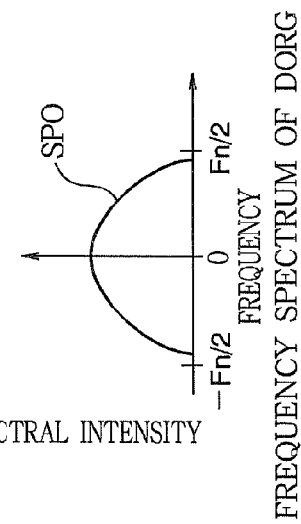
Figure 9D:
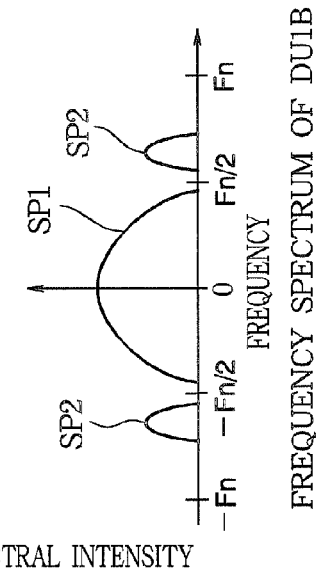
Figure 9C:
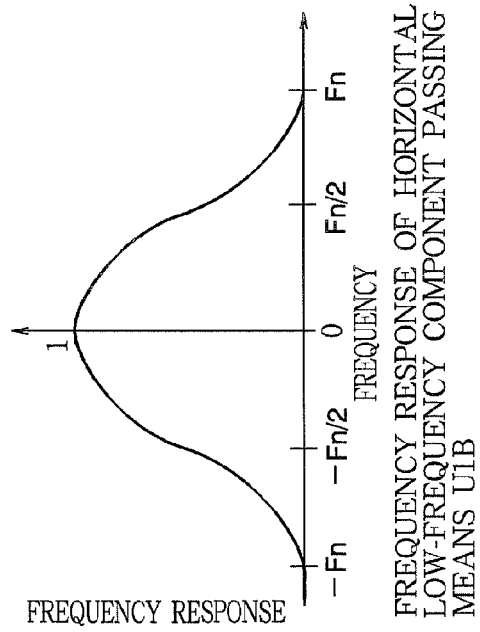

FIGS. 9(A) to 9(D) represent the effect of processing by the image enlarging means U1 in the frequency domain: FIG. 9(A) represents the frequency spectrum of the original image DORG; FIG. 9(B) represents the frequency spectrum of image DU1A; FIG. 9(C) represents the frequency response of the horizontal low-frequency component passing means U1B; FIG. 9(D) represents the frequency spectrum of image DU1B. In FIGS. 9(A) to 9(D), the horizontal axis is a frequency axis representing spatial frequency in the horizontal direction, and the vertical axis represents the intensity value of the frequency spectrum or frequency response.

The number of pixels in the original image DORG is half the number of pixels in the input image DIN; in other words, the sampling interval of the original image DORG is twice the sampling interval of the input image DIN. Consequently, the Nyquist frequency of the original image DORG is half the Nyquist frequency of the input image DIN, i.e., Fn/2.

For the sake of simplicity, a single frequency axis is used in FIGS. 9(A) to 9(D). Image data in general, however, assign pixel values to pixels arranged in a two-dimensional array, and their frequency spectra are described in a plane determined by a horizontal frequency axis and a vertical frequency axis. Accordingly, both the horizontal frequency axis and the vertical frequency axis should be indicated to represent the frequency spectra of images such as DORG accurately. Since frequency spectra are generally isotropic about the origin of the frequency axes, if a frequency spectrum is given in a space with a single frequency axis, those skilled in the art can easily imagine how the frequency spectrum appears in a space with two frequency axes. Therefore, unless otherwise specified, spaces with a single frequency axis will be used in the descriptions related to the frequency domain.

First the frequency spectrum of the original image DORG will be described. The image input as the original image DORG is generally a natural image, in which case its spectral intensity is concentrated around the origin of the frequency space. The frequency spectrum of the original image DORG accordingly resembles spectrum SPO in FIG. 9(A).

Next the spectral intensity of image DU1A will be described. Image DU1A is generated by inserting a pixel having a pixel value of 0 for each pixel in the original image DORG in the horizontal direction. This processing causes the frequency spectrum to fold over at the Nyquist frequency of the original image DORG. Because a spectrum SPM is generated by fold-over of the spectrum SPO at frequencies of ±Fn/2, the frequency spectrum of image DU1A is represented as shown in FIG. 9(B).

Next the frequency response of the horizontal low-frequency component passing means U1B will be described. The horizontal low-frequency component passing means is implemented by a low-pass filter, and its frequency response decreases as the frequency increases, as shown in FIG. 9(C).

Finally, the frequency spectrum of image DU1B will be described. The image DU1B shown in FIG. 9(D) is obtained by performing low-pass filter processing, with the frequency response shown in FIG. 9(C), on the image DU1A having the frequency spectrum shown in FIG. 9(B). Accordingly, as shown, the frequency spectrum of image DU1B includes a spectrum SP2 having a somewhat lower intensity than spectrum SPM and a spectrum SP1 having a somewhat lower intensity than spectrum SPO. The frequency response of a low-pass filter generally decreases as the frequency increases. In comparison with spectrum SPO, spectrum SP1 has an intensity lowered by the horizontal low-frequency component passing means U1B on the high-frequency side, at frequencies near ±Fn/2.

Among the processing by the image enlarging means U1, the effects in the frequency domain of the processing performed by the vertical zero insertion means U1C and the vertical low-frequency component passing means U1D will not be described, but from the content of the processing it can be easily understood that the effects are the same as described with reference to FIGS. 9(A) to 9(D), though in the direction of the vertical spatial frequency axis. The frequency spectrum of image DU1D becomes a two-dimensional expansion of the frequency spectrum shown in FIG. 9(D).

In the subsequent description, spectrum SP2 will be referred to as the fold-over component. The fold-over component appears on an image as a spurious signal or noise having relatively high frequency components. This type of noise or spurious signal includes overshoot, jaggies, ringing, and the like.

The effects of the image processing apparatus according to the invention will now be described.

Figure 10D:
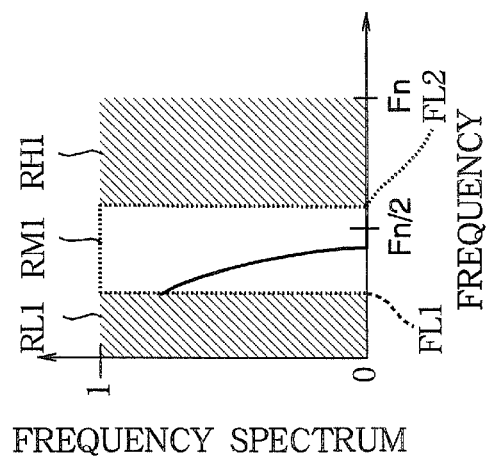
Figure 10E:
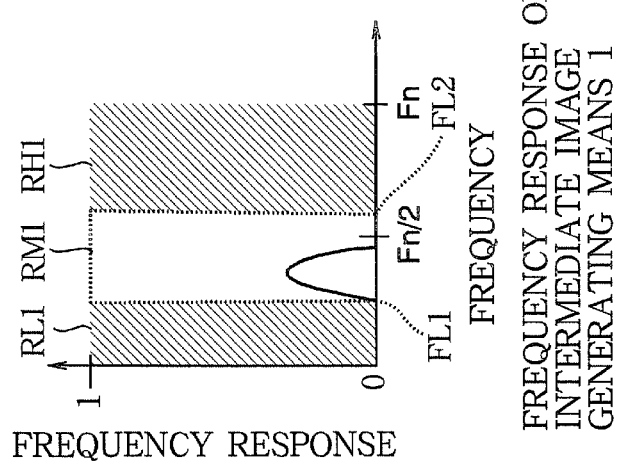

FIGS. 10(A) to 10(E) are diagrams schematically representing the effect of generating intermediate image D1 from the input image DIN when an image DU1D obtained by enlarging the original image DORG is input as the input image DIN (or image DU1): FIG. 10(A) represents the frequency spectrum of the input image DIN; FIG. 10(B) represents the frequency response of the high-frequency component image generating means 1A; FIG. 10(C) represents the frequency response of the low-frequency component image generating means 1B; FIG. 10(D) represents the frequency response of the intermediate image generating means 1; FIG. 10(E) represents the frequency spectrum of intermediate image D1. FIGS. 10(A) to 10(E) use just a single frequency axis for the same reason as in FIGS. 9(A) to 9(D).

In FIGS. 10(A) to 10(E), the intensity value of the frequency spectrum or frequency response is shown only in the range where the spatial frequency is zero or greater, but the frequency spectrum or frequency response described below is symmetrical about the origin on the frequency axis. Therefore, the diagrams used in the description, showing only the range in which the spatial frequency is zero or greater, are sufficient.

First the frequency spectrum of the input image DIN will be described. Because an image DU1D generated by enlargement processing in the image enlarging means U1 is input as the input image DIN, the frequency spectrum of the input image DIN, shown in FIG. 10(A), has the same shape as shown in FIG. 9(D), including a spectrum SP1 which has a lower intensity than the spectrum SPO of the original image DORG and a spectrum SP2, which is a fold-over component.

Next the frequency response of the high-frequency component image generating means 1A will be described. Since the high-frequency component image generating means 1A is implemented by a high-pass filter, its frequency response decreases as the frequency decreases, as shown in FIG. 10(B).

Next the frequency response of the low-frequency component image generating means 1B will be described. Since the low-frequency component image generating means 1B is implemented by a low-pass filter, its frequency response decreases as the frequency increases, as shown in FIG. 10(C).

Next the frequency response of the intermediate image generating means 1 will be described. Among the frequency components of the input image DIN, the frequency components in a low-frequency region RL1 (the frequency band lower than the first frequency FL1) shown in FIG. 10(D) are weakened by the high-frequency component image generating means 1A in the intermediate image generating means 1. The frequency components in a high-frequency region RH1 (the frequency band higher than the second frequency FL2) shown in FIG. 10(D) are weakened by the low-frequency component image generating means 1B in the intermediate image generating means 1. Therefore, as shown in FIG. 10(D), the frequency response of the intermediate image generating means 1 has a peak in an intermediate region (a particular frequency band) RM1 limited by the low-frequency region RL1 and the high-frequency region RH1.

Next the frequency spectrum of intermediate image D1 will be described. The intermediate image D1 shown in FIG. 10(E) is obtained by passing the input image DIN having the frequency spectrum shown in FIG. 10(A) through the intermediate image generating means 1 having the frequency response shown in FIG. 10(D). Since the frequency response of the intermediate image generating means 1 peaks in the intermediate region RM1 limited by the low-frequency region RL1 and the high-frequency region RH1, the frequency spectrum of intermediate image D1 is the frequency spectrum of the input image DIN with attenuation of the parts included in the low-frequency region RL1 and high-frequency region RH1. Therefore, spectrum SP2, which would become a fold-over component, is removed from the high-frequency component of input image DIN in intermediate image D1. In other words, the intermediate image generating means 1 has the effect of generating intermediate image D1 by removing spectrum SP1, which becomes a fold-over component, from the high-frequency component of the input image DIN.

Figure 11C:
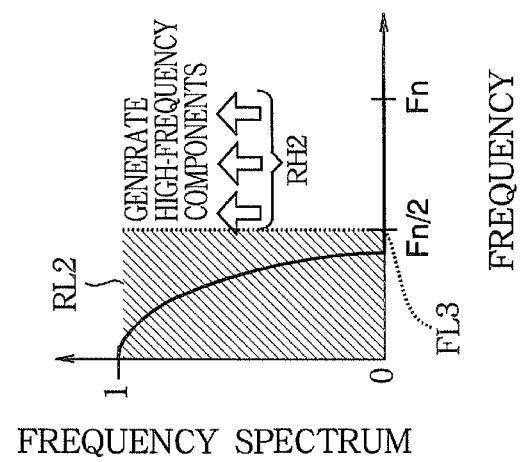
FIGS. 11(A) to 11(C) are diagrams showing frequency spectra and a frequency response to illustrate the operation of the intermediate image processing means 2 in FIG. 1.
Figure 11B:
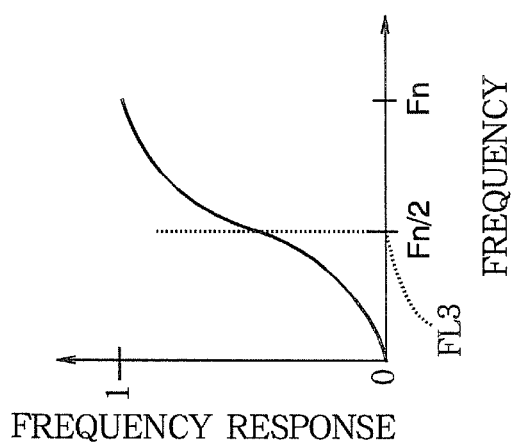
Figure 11A:
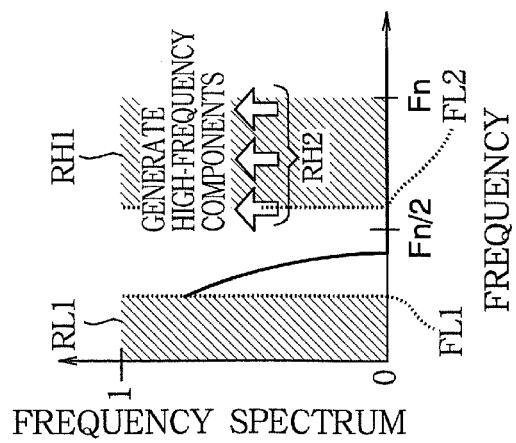

FIGS. 11(A) to 11(C) are diagrams representing the effect of the intermediate image processing means 2: FIG. 11(A) represents the frequency spectrum of the non-linearly processed image D2A; FIG. 11(B) represents the frequency response of the high-frequency component image generating means 2B; FIG. 11(C) represents the frequency spectrum of image D2B. FIGS. 11(A) to 11(C) represent the frequency spectra and frequency response only in regions where the spatial frequency is 0 or greater, for the same reason as in FIGS. 10(A) to 10(E).

A high-frequency component corresponding to the high-frequency region RH2 is generated in non-linearly processed image D2A, as described later. FIG. 11(A) expresses this schematically. The image D2B shown in FIG. 11(C) is generated by passing the non-linearly processed image D2A through the high-frequency component image generating means 2B. The high-frequency component image generating means 2B includes a high-pass filter that passes components higher than the third frequency FL3, and its frequency response increases as the frequency increases as shown in FIG. 11(B). Accordingly, the frequency spectrum of image D2B is obtained by removing a component corresponding to the low-frequency region RL2 (the frequency component lower than the third frequency FL3) from the frequency spectrum of the non-linearly processed image D2A, as shown in FIG. 11(C). In other words, the non-linear processing means 2A has the effect of generating a high-frequency component corresponding to the high-frequency region RH2, and the high-frequency component image generating means 2B has the effect of extracting only the high-frequency component generated by the non-linear processing means 2A. In the illustrated example, the third frequency FL3 is substantially equal to Fn/2.

The effects will now be described in further detail.

FIGS. 12(A) to 12(C) and FIGS. 13(A) to 13(C) are diagrams illustrating signals obtained when a step edge is sampled.

Figure 12A:
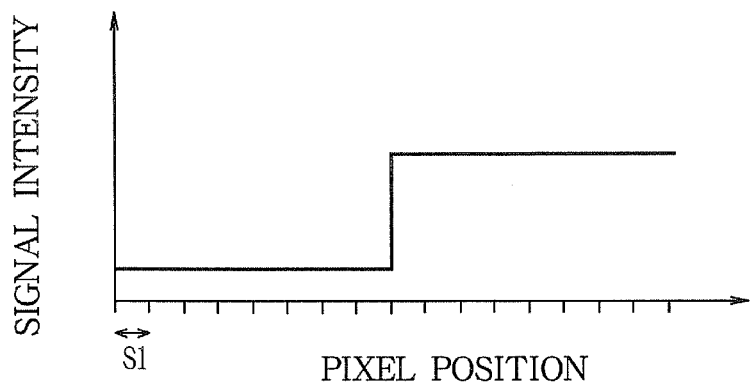
FIGS. 12(A) to 12(C) are diagrams illustrating a step edge and indicating values of consecutive pixel signals obtained when the step edge is sampled at a sampling interval S1.
Figure 12B:
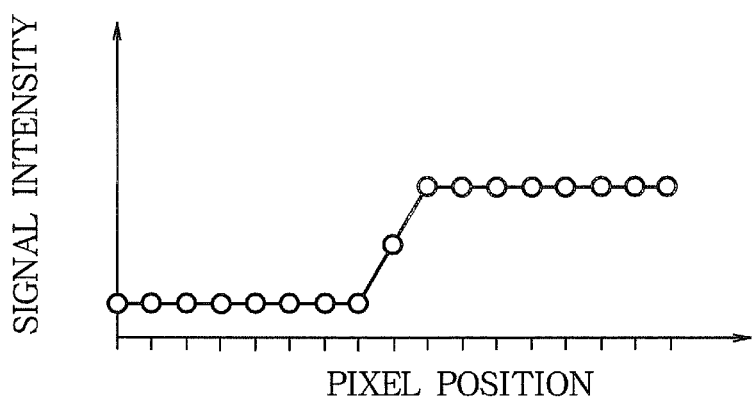
Figure 12C:
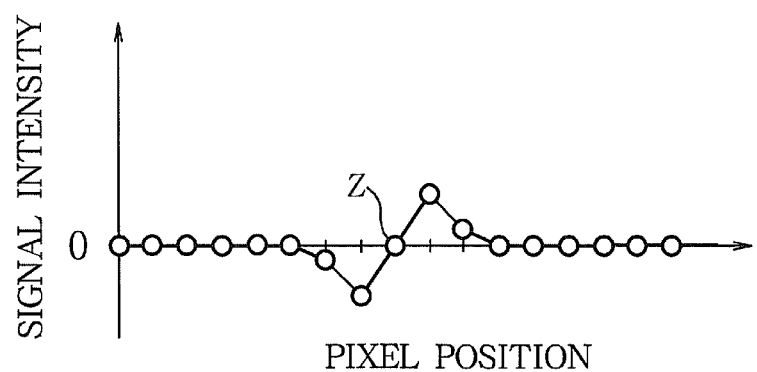
Figure 13A:
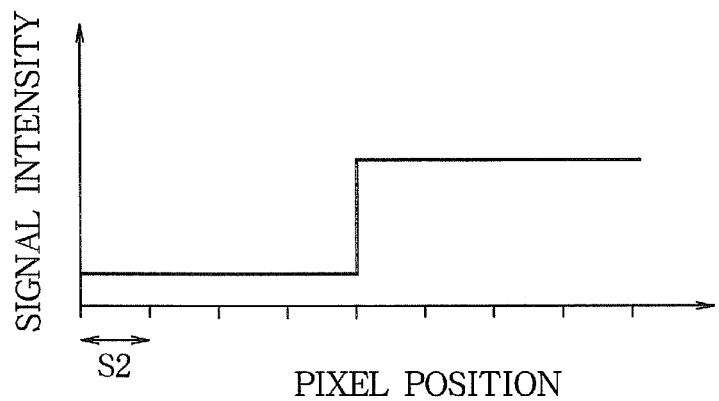
FIGS. 13(A) to 13(C) are diagrams illustrating a step edge and indicating values of consecutive pixel signals obtained when the step edge is sampled at a sampling interval S2.
Figure 13B:
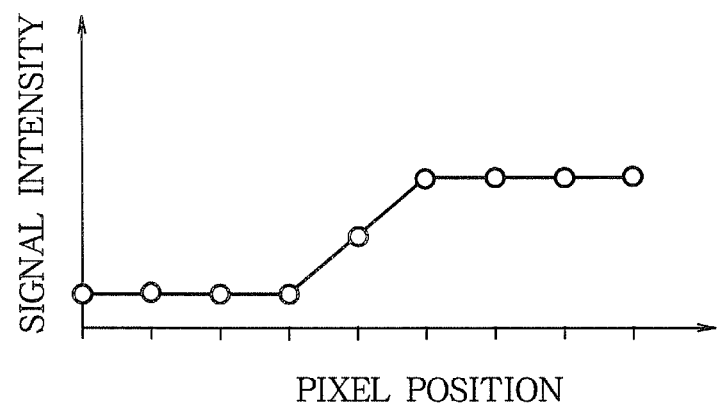
Figure 13C:
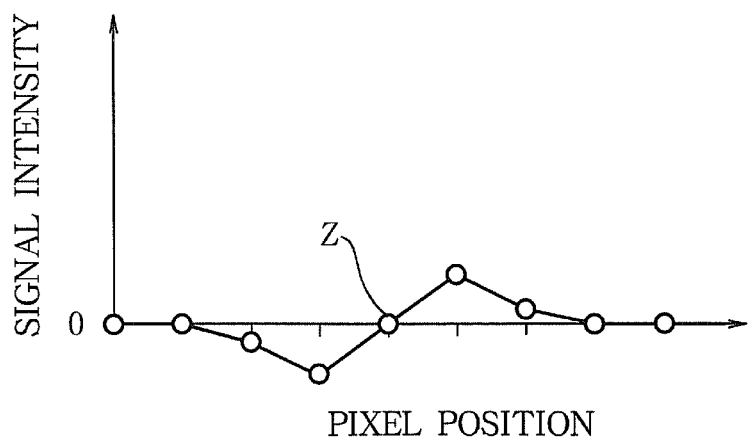

FIG. 12(A) shows a step edge and a sampling interval S1; FIG. 12(B) shows the signal obtained when the step edge is sampled at sampling interval S1; FIG. 12(C) shows the high-frequency component of the signal shown in FIG. 12(B). FIG. 13(A) shows a step edge and a sampling interval S2, which is longer than sampling interval S1; FIG. 13(B) shows the signal obtained when the step edge is sampled at sampling interval S2; FIG. 13(C) shows the high-frequency component of the signal shown in FIG. 13(B). In the description below, the length of sampling interval S2 is half the length of sampling interval S1.

As shown in FIGS. 12(C) and 13(C), the center of the step edge appears as a zero-crossing point Z in the signal representing the high-frequency component. The slope of the signal representing the high-frequency component near the zero-crossing point Z increases as the length of the sampling interval decreases, and the positions of the points that give the local maximum and local minimum values near the zero-crossing point Z approach the zero-crossing point Z as the length of the sampling interval decreases.

That is, a change in sampling interval does not change the position of the zero-crossing point in the signal representing the high-frequency component near the edge, but as the sampling interval decreases (or the resolution increases), the slope of the high-frequency component near the edge increases, and the position of the points that give the local maximum and minimum values approach the zero-crossing point.

FIGS. 14(A) to 14(F) are diagrams illustrating effects when the signal obtained by sampling the step edge at sampling interval S2 is enlarged to twice its size and then input to the image processing apparatus in this invention, and more specifically the effects of the intermediate image generating means 1 and intermediate image processing means 2. As described earlier, the processing in the intermediate image generating means 1 and intermediate image processing means 2 is performed in the horizontal direction and the vertical direction separately, and the processing is carried out one-dimensionally. Accordingly, in FIGS. 14(A) to 14(F), the content of the processing is represented by using a one-dimensional signal.

Figure 14A:
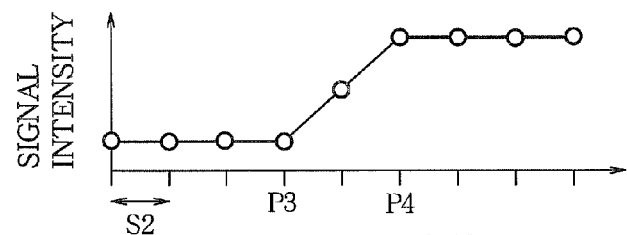
FIGS. 14(A) to 14(F) are diagrams indicating values of consecutive pixel signals to illustrate the operation of the intermediate image generating means 1 and intermediate image processing means 2 in FIG. 1.
Figure 14B:
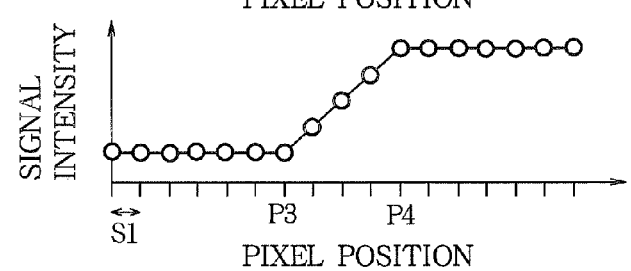

Like FIG. 13(B), FIG. 14(A) shows the signal obtained when the step edge is sampled at sampling interval S2. FIG. 14(B) shows a signal obtained by enlarging the signal shown in FIG. 14(A) to twice its size. That is, if the original image DORG contains an edge as shown in FIG. 14(A), a signal as shown in FIG. 14(B) is input as the input image DIN. When the signal is enlarged to twice its size, the sampling interval becomes half of what it was before the enlargement. The sampling interval of the signal shown in FIG. 14(B) is therefore the same as sampling interval S1 in FIGS. 12(A) to 12(C). In FIG. 14(A), the position denoted by coordinate P3 is on the boundary of the low luminance region (low level side) of the edge signal, and the position denoted by coordinate P4 is on the boundary of the high luminance region (high level side) of the edge signal.

Figure 14C:
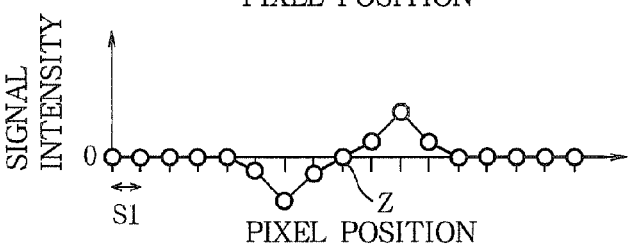

FIG. 14(C) shows a signal representing the high-frequency component of the signal shown in FIG. 14(B), that is, a signal corresponding to the image D1A output from the high-frequency component image generating means 1A. Since image D1A is obtained by extracting the high-frequency component in the input image DIN, it also includes a fold-over component.

Figure 14D:
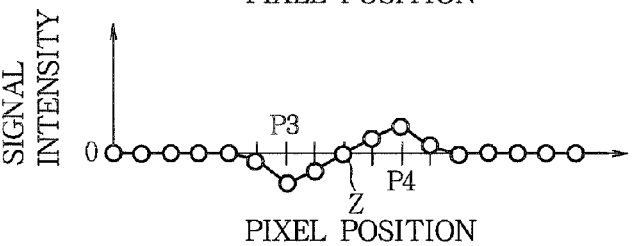

FIG. 14(D) shows a signal representing the low-frequency component of the signal shown in FIG. 14(C), that is, a signal corresponding to the image D1B output from the low-frequency component image generating means 1B. Since, as described earlier, image D1B is output as intermediate image D1, FIG. 14(D) also corresponds to intermediate image D1. In the vicinity of the zero-crossing point Z in intermediate image D1, a local minimum value appears at coordinate P3, and a local maximum value appears at coordinate P4, as shown in FIG. 14(D), matching the form of the high-frequency component extracted from the signal obtained by sampling the step edge at sampling interval S2 as shown in FIG. 13(C). The fold-over component is removed from image D1A by the low-pass filtering process performed by the low-frequency component image generating means 1B.

Figure 14E:
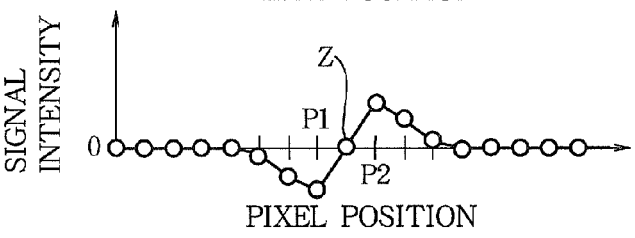

FIG. 14(E) shows the signal output when the signal shown in FIG. 14(D) is input to the non-linear processing means 2A, that is, it illustrates the image D2A output from the non-linear processing means 2A when intermediate image D1 is input. In the non-linear processing means 2A, the signal values at the coordinates P1 and P2 preceding and following (adjacently preceding and following) the zero-crossing point are amplified. Therefore, the magnitudes of the signal values at coordinates P1 and P2 in image D2A become greater than the other values, as shown in FIG. 14(E); the position where the local minimum value appears near the zero-crossing point Z changes from coordinate P3 to coordinate P1, which is closer to the zero-crossing point Z; and the position where the local maximum value appears changes from coordinate P4 to coordinate P2, which is closer to the zero-crossing point Z. This means that the high-frequency component is generated by a non-linear process that amplifies the values of the pixels preceding and following the zero-crossing point Z in the non-linear processing means 2A. A high-frequency component can be generated in this way by changing the amplification factor appropriately for each pixel or by changing the content of the processing appropriately for each pixel. The non-linear processing means 2A has the effect of generating a high-frequency component which is not included in intermediate image D1, that is, a high-frequency component corresponding to the high-frequency region RH2 shown in FIG. 11(A).

Figure 14F:
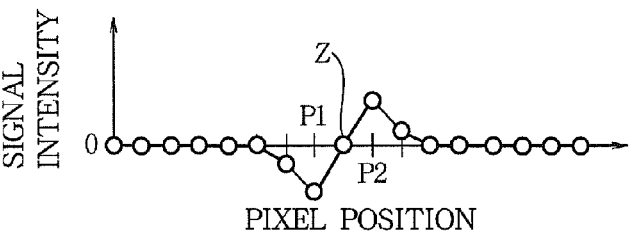

FIG. 14(F) shows a signal representing the high-frequency component of the signal shown in FIG. 14(E), that is, a signal corresponding to the image D2B output from the high-frequency component image generating means 2B. In the vicinity of the zero-crossing point Z in image D2B, the local minimum value (negative peak) appears at coordinate P1 and the local maximum value (positive peak) appears at coordinate P2, as shown in FIG. 14(F), matching the form of the high-frequency component extracted from the signal obtained by sampling the step edge at sampling interval S1, shown in FIG. 12(C). This means that the high-frequency component generated in the non-linear processing means 2A is extracted by the high-frequency component image generating means 2B and output as image D2B.

It could also be said that the extracted image D2B is a signal including a frequency component corresponding to the sampling interval S1. In other words, the high-frequency component image generating means 2B has the effect of extracting only the high-frequency component generated by the non-linear processing means 2A.

Adding means 2C combines horizontally processed image D1*h* and vertically processed image D1*v*, thereby generating the combined intermediate image D1hv, combines horizontally processed image D2Bh and vertically processed image D2Bv, thereby generating the combined image D2Bhv, and generates image D2C by adding the combined intermediate image D1hv and the combined image D2Bhv.

Image enhancement processing could be carried out at this point by adding the intermediate image D1 in FIG. 14(D) and image D2B in FIG. 14(F), which have been described above, to the input image DIN. Although this invention does not directly add the first and second intermediate image D1 and image D2B to the input image DIN, the effects that would be obtained by adding the first intermediate image D1 and image D2B will be described below; then the effects of adding the intermediate image D2C obtained by processing the first intermediate image D1 and image D2B in adding means 2C (in other words, the effect obtained by adding the combined first intermediate image D2hv and combined image D2Bhv) will be described.

First, the effect of adding intermediate image D1 will be described. As described earlier, intermediate image D1 is obtained by excluding the fold-over component from the high-frequency component of the input image DIN, and corresponds to the high-frequency component near the Nyquist frequency of the original image DORG, as shown in FIG. 10(E). The spectral intensity near the Nyquist frequency of the original image DORG is weakened by the enlargement processing in the image enlarging means U1, as described with reference to FIG. 9(D). The spectral intensity weakened by the enlargement processing can be made up for by adding intermediate image D1. Since the fold-over component has been excluded from intermediate image D1, spurious signals such as overshoot, jaggies, and ringing are not enhanced.

Next the effect of adding intermediate image D2B will be described. As described above, image D2B is the high-frequency component corresponding to sampling interval S1. Adding image D2B can accordingly supply a high-frequency component in the band above the Nyquist frequency of the original image DORG, so the perceived image resolution can be increased.

Accordingly, by adding intermediate image D1 and image D2B to the input image DIN, high-frequency components can be added without enhancing the fold-over component, and the perceived image resolution can be improved.

If the horizontally processed image and vertically processed image are combined by simple addition, however, the correction quantity is not constant but depends on the directions of edges included in the input image, causing artifacts in the processed image.

FIGS. 15(A) to 15(E), FIGS. 16(A) to 16(E), and FIGS. 17(A) to 17(E) are schematic drawings illustrating the causes of the above artifacts and the effects of adding means 2C. As the input image, the following cases, shown in FIGS. 15(A), 16(A), and 17(A), will be considered.

(i) A horizontal edge is included (FIG. 15(A)).
  (ii) A diagonal edge is included.
  (iii) A vertical edge is included.

Figure 17:
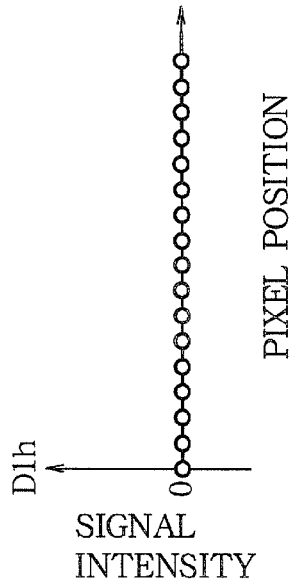
FIG. 17(A) is a diagram showing a vertical edge.
FIGS. 17(B) to 17(E) are diagrams indicating image signals obtained when the edge direction is vertical as in FIG. 17(A).
Figure 17:
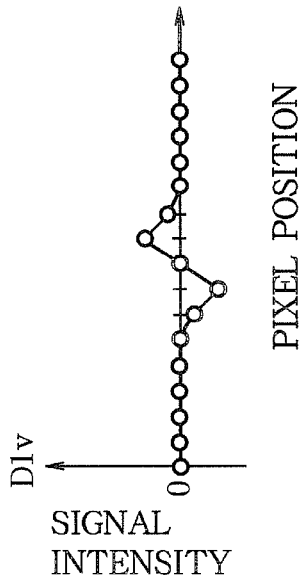
Figure 17:
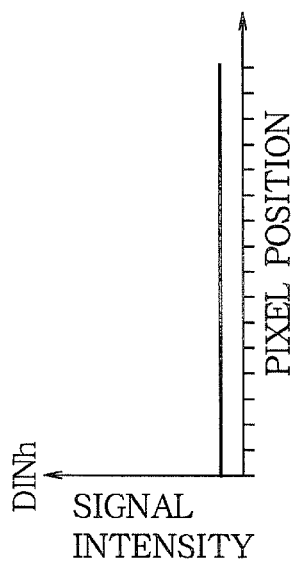
Figure 17:
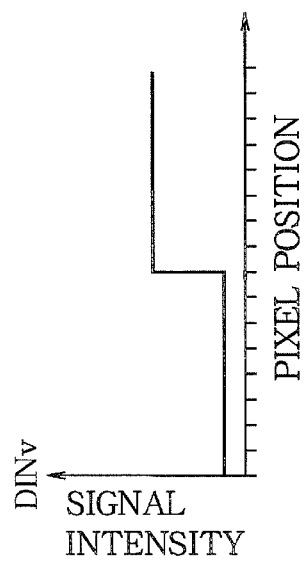
Figure 17:
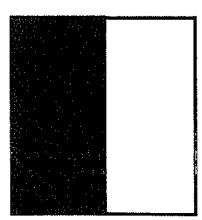

The intensities of pixel signals supplied sequentially from left to right in the horizontal direction (the signals (denoted 'DINh') processed in the horizontal high-frequency component image generating means 1Ah) for these cases are indicated in FIGS. 15(B), 16(B), and 17(B), respectively; the intensities of pixel signals supplied sequentially from top to bottom in the vertical direction (the signals (denoted 'DINv') processed in the vertical high-frequency component image generating means 1Av) are indicated in FIGS. 15(C), 16(C), and 17(C), respectively.

If the horizontal components and vertical components of the edges in each of these cases are considered separately, whereas step edges are formed by just one component, either the horizontal component or the vertical component, in cases (i) and (iii), in case (ii) step edges are formed by both the horizontal and vertical components.

FIGS. 15(D), 16(D), and 17(D) indicate the signal intensities of the horizontal intermediate image D1h obtained by horizontal processing of the input image (DINh) shown in FIGS. 15(B), 16(B), and 17(B); FIGS. 15(E), 16(E), and 17(E) indicate the signal intensities of the vertical intermediate image D1v obtained by vertical processing of the input image (DINv) shown in FIGS. 15(C), 16(C), and 17(C).

The absolute values of the signal intensities of intermediate image D1 in the vicinity of the edge are large in the horizontal component and zero in the vertical component in case (i), large in both the horizontal component and vertical component in case (ii), and large in the vertical component and zero in the horizontal component in case (iii).

Accordingly, if image D1h and image D1v are simply added, the correction quantity is about twice as large for a diagonal edge as for horizontal and vertical edges. As a result, the correction intensity varies depending on the edge direction, which causes problems such as large overshoot at diagonal edges.

In adding means 2C, therefore, images D1h and D1v are not simply added; they are added after being multiplied by weighting coefficients corresponding to the edge direction. As described earlier, in adding means 2C, the edge direction estimating means 511 provided in the weighting coefficient generating means 401 calculates differences (dH−dV) between absolute values in images D1h and D1v. The difference (dH−dV) is a quantity corresponding to edge direction, taking a comparatively large positive value in the vicinity of a horizontal edge, a value near 0 in the vicinity of a diagonal edge, and a negative value with a comparatively large absolute value in the vicinity of a vertical edge.

As described above, the edge direction estimating means 511 estimates edge direction from these differences (dH−dV), eliminating the need to provide another means, such as a two-dimensional filter, for detecting edge direction, so an increase in circuit size can be prevented.

The weighting coefficient determining means 512 determines a horizontal component weighting coefficient D512h and a vertical component weighting coefficient D512v according to the difference (dH−dV), from the relationships shown in FIGS. 5(A) and 5(B).

Specifically, as the difference (dH−dV) increases, the weight of image D1h is increased while the weight of image D1v is reduced. If the difference (dH−dV) has a negative value, however, then as its absolute value increases, the weight of image D1h is increased while the weight of image D1v is reduced. As the difference (dH−dV) approaches 0, the weights approach ½. In this way, an image enhancement correction can be carried out without impairing the effect described above of improving the perceived image resolution and without causing prominent artifacts. Compared with direct addition of images D1 and D2B, this correction can eliminate the problems of direct addition and produce an effect similar to the effect, described earlier, that would be obtained by adding images D1 and D2B.

The method of determining the weighting coefficients in the weighting coefficient determining means 512 is not limited to the relations shown in FIGS. 5(A) and 5(B); any relation, such as a relation defined by a smooth curve, for example, may be used if it meets the above objective. Such a curve may also be approximated by a polyline. More generally, it is only necessary for the horizontal component weighting coefficient to be determined from a characteristic that increases monotonically with respect to the difference (dH−dV), the vertical component weighting coefficient to be determined from a characteristic that decreases monotonically with respect to the difference (dH−dV), and the weighting coefficients to satisfy a relationship in which the sum of the horizontal component weighting coefficient and the vertical component weighting coefficient always remains constant.

Furthermore, although the edge direction estimating means 511 calculates the above difference (dH−dV) as an edge direction estimation quantity D511, a quantity calculated by some other relational expression may be used, as long as it is correlated with edge direction. In that case, the weighting coefficient determining means 512 should be altered according to the edge direction estimation quantity D511 so that the above purposes are accomplished.

The description above has dealt with the addition of the horizontal component D1*h* and vertical component D1*v* of intermediate image D1, but the same also applies to the addition of the horizontal component D2B*h* and vertical component D2B*v* of intermediate image D2B. The example shown in FIG. 4 also uses the weighting coefficients D512*h* and D512*v* determined in the weighting coefficient generating means 401 in adding the horizontal component D2B*h* and vertical component D2B*v* of intermediate image D2B.

In adding means 3, image D2C is added as intermediate image D2 to the input image DIN. Accordingly, high-frequency components are added to improve the perceived image resolution without increasing overshoot, jaggies, or ringing due to fold-over components.

In addition, in the image processing apparatus in the invention, the intermediate image generating means 1 and the intermediate image processing means 2 perform image processing in the horizontal direction and the vertical direction in parallel. Accordingly, the effects described above can be obtained not just in the horizontal or vertical direction but in any direction.

Considered in the frequency domain, the image processing apparatus in this invention generates an image D2B corresponding to high-frequency components near the Nyquist frequency ±Fn of the input image DIN on the basis of the components in the input image DIN near half the Nyquist frequency of the original image DORG, ±Fn/2, (or in a particular frequency band), in a frequency band from the origin to Fn. Even if the frequency components near the Nyquist frequency ±Fn have been lost in the input image DIN, accordingly, frequency components near the Nyquist frequency ±Fn can be supplied by image D2B.

The location used as the particular frequency band is not limited to the vicinity of ±Fn/2. The frequency band to be used can be changed by changing the frequency response of the high-frequency component image generating means 1A and low-frequency component image generating means 1B appropriately.

In the description given above, image enlargement processing is indicated as an example in which frequency components near the Nyquist frequency Fn are lost, but that is not the only cause of the loss of frequency components near the Nyquist frequency Fn in the input image DIN; noise suppression and various other causes can also be considered. Therefore, the use of the image processing apparatus of the invention is not limited to processing following image enlargement processing.

Second Embodiment

In the image processing apparatus according to the second embodiment, only the internal structure of adding means 2C differs from the first embodiment; adding means 2C is structured so that the weighting coefficients used to combine images D2B*h* and D2B*v* are determined from images D2B*h* and D2B*v*.

Figure 18:
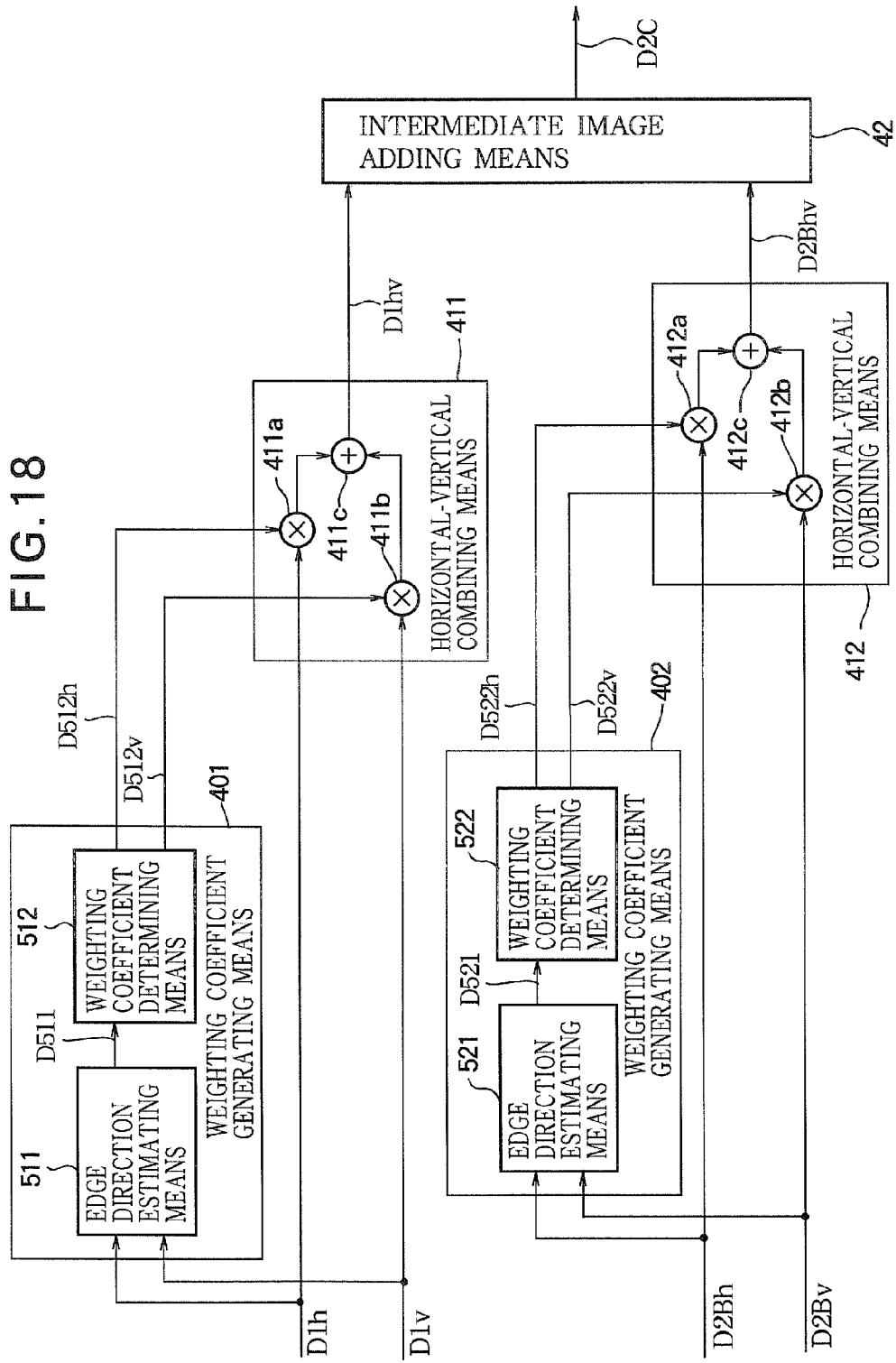
FIG. 18 is a block diagram illustrating an exemplary structure of the adding means 2C utilized in an image processing apparatus according to a second embodiment of the invention.

FIG. 18 shows an exemplary structure of the adding means 2C in the image processing apparatus according to the second embodiment of the invention. The illustrated adding means 2C is generally the same as the adding means 2C in FIG. 4, but differs in that a weight output coefficient generating means 402 is added; the addition carried out in the horizontal-vertical combining means 412 uses weighting coefficients D522*h* and D522*v* output from the weight coefficient generating means 402.

As in FIG. 4, the weighting coefficient generating means (the first weighting coefficient generating means) 401 determines a weighting coefficient D512*h* for image D1*h* and a weighting coefficient D512*v* for image D1*v* from images D1*h* and D1*v*.

The horizontal-vertical combining means (the first horizontal and vertical combining means) 411 performs weighted addition of images D1*h* and D1*v* according to the weighting coefficients D512*h* and D512*v* obtained in the weighting coefficient generating means 401 and obtains an image D1*hv* in which the horizontal components and vertical components are combined.

Concurrent with the processing above, from images D2B*h* and D2B*v*, the weighting coefficient generating means (the second weighting coefficient generating means) 402 determines a weighting coefficient D522*h* for image D2B*h* and a weighting coefficient D522*v* for image D2B*v*. Weighting coefficients D522*h* and D522*v* can be determined in the way in which weighting coefficients D512*h* and D512*v* are determined in weighting coefficient generating means 401, so as to be related as shown in FIGS. 5(A) and 5(B), for example, (except that the horizontal axis indicates the difference (dH'−dV') between an absolute value dH' in image D2B*h* and an absolute value dV' in image D2B*v*, and the vertical axis indicates the weighting coefficients D522*h* and D522*v*). In this case, the relationships of D522*h* and D522*v* to dH'−dV' may be exactly the same as the relationships of D512*h* and D512*v* to dH−dV, or the relationships may differ from each other.

The horizontal-vertical combining means (the second horizontal-vertical combining means) 412 performs weighted addition of images D2B*h* and D2B*v* according to the weighting coefficients D522*h* and D522*v* obtained by the weighting coefficient generating means 402 and obtains an image D2B*hv* in which the horizontal and vertical components are combined.

The intermediate image adding means 42 adds images D1*hv* and D2B*hv* and outputs image D2C.

The adding means 2C in the second embodiment has a structure in which the weighting coefficient generating means 402 for determining weighting coefficients for images D2B*h* and D2B*v* is added to the structure of the adding means 2C in the first embodiment shown in FIG. 4, and horizontal-vertical combining means 412 performs weighted addition of images D2B*h* and D2B*v* by using the weighting coefficients obtained by weighting coefficient generating means 402. The structure and operation of the weighting coefficient generating means 401, horizontal-vertical combining means 411, and intermediate image adding means 42 are the same as in the first embodiment. Weighting coefficient generating means 402 further includes an edge direction estimating means 521 and weighting coefficient determining means 522 that operate similarly to the edge direction estimating means 511 and weighting coefficient determining means 512 in weighting coefficient generating means 401.

The image processing apparatus according to the second embodiment of the invention has the same effects as the image processing apparatus in the first embodiment of the invention. In addition, adding means 2C has an additional weighting coefficient generating means 402 that can determine more appropriate coefficients for combining the images D2Bh and D2Bv obtained through processing in the non-linear processing means 2A, improving the quality of processed picture.

Third Embodiment

Figure 19:
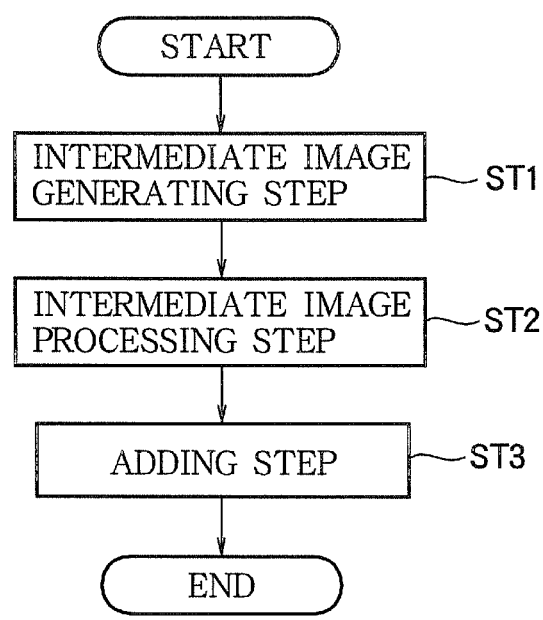
FIG. 19 is a flowchart illustrating processing steps in an image processing method according to a third embodiment of the invention.

FIG. 19 is a flowchart illustrating an image processing method according to a third embodiment of the invention; this image processing method includes an intermediate image generating step ST1, an intermediate image processing step ST2, and an adding step ST3.

Figure 20:
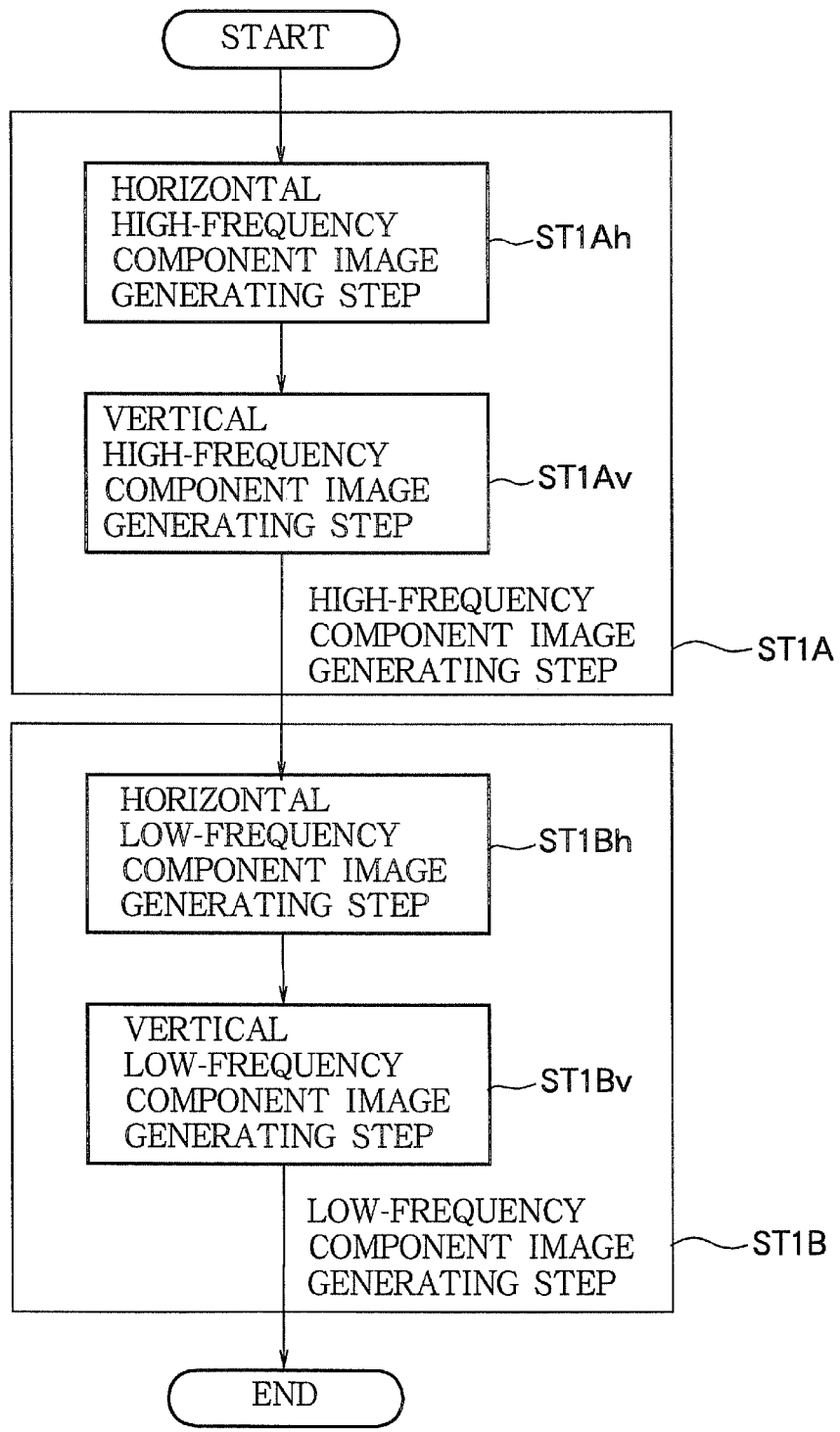
FIG. 20 is a flowchart illustrating processing in the intermediate image generating step ST1 in FIG. 19.

The intermediate image generating step ST1 includes, as shown in FIG. 20, a high-frequency component image generating step ST1A and a low-frequency component image generating step ST1B.

The high-frequency component image generating step ST1A includes a horizontal high-frequency component image generating step ST1Ah and a vertical high-frequency component image generating step ST1Av, and the low-frequency component image generating step ST1B includes a horizontal low-frequency component image generating step ST1Bh and a vertical low-frequency component image generating step ST1Bv.

Figure 21:
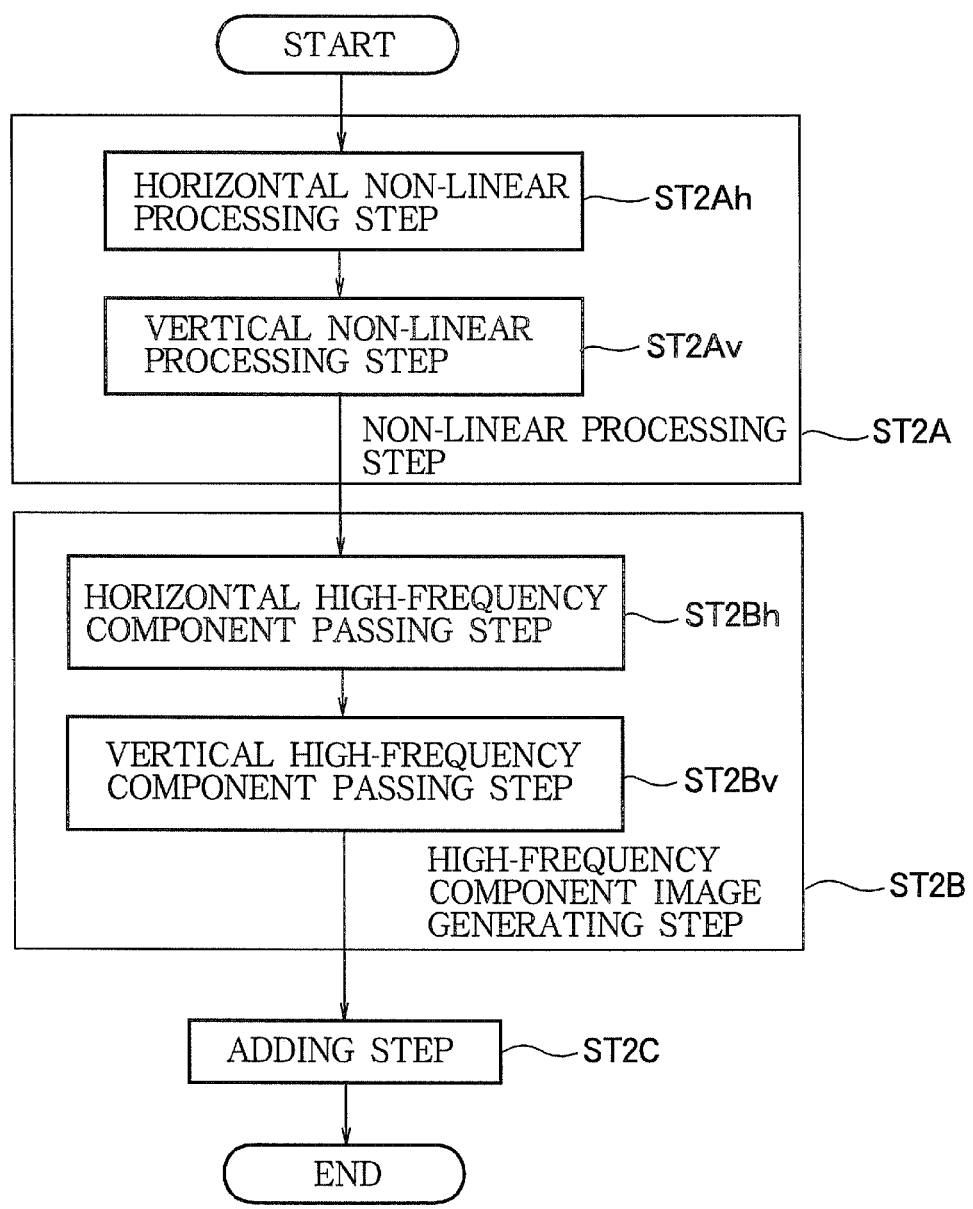
FIG. 21 is a flowchart illustrating processing in the intermediate image processing step ST2 in FIG. 19.

The intermediate image processing step ST2 includes, as shown in FIG. 21, a non-linear processing step ST2A, a high-frequency component image generating step ST2B, and an adding step DT2C.

The non-linear processing step ST2A includes a horizontal non-linear processing step ST2Ah and a vertical non-linear processing step ST2Av, and the high-frequency component image generating step ST2B includes a horizontal high-frequency component passing step ST2Bh and a vertical high-frequency component passing step ST2Bv.

Figure 22:
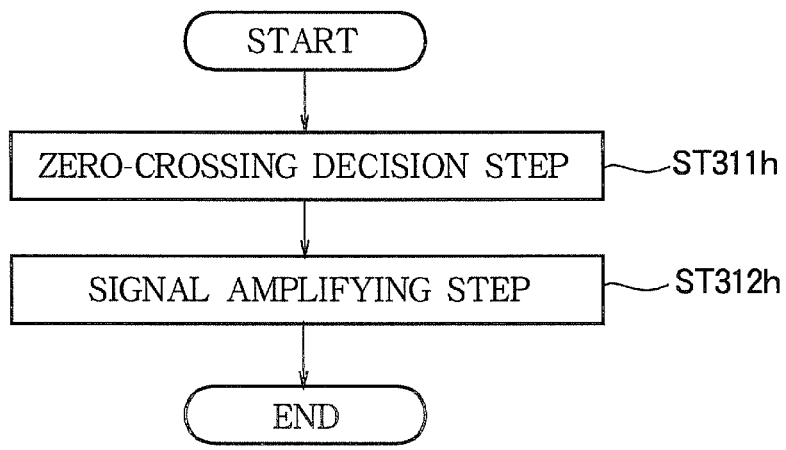
FIG. 22 is a flowchart illustrating processing in the horizontal non-linear processing step ST2Ah in FIG. 21.
Figure 23:
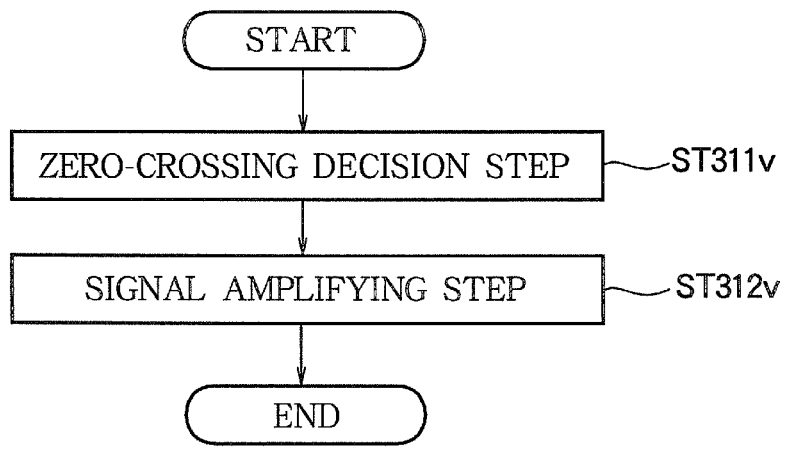
FIG. 23 is a flowchart illustrating processing in the vertical non-linear processing step ST2Av in FIG. 21.

The horizontal nonlinear processing step ST2Ah includes, as shown in FIG. 22, a zero-crossing decision step ST311$h$ and a signal amplifying step ST312$h$, and the vertical nonlinear processing step ST2Av includes, as shown in FIG. 23, a zero-crossing decision step ST311$v$ and a signal amplifying step ST312$v$.

First the operation of the intermediate image generating step ST1 will be described with reference to the flowchart in FIG. 20.

In high-frequency component image generating step ST1A, the following processing is performed on an input image DIN input in an image input step, which is not shown.

First, in the horizontal high-frequency component image generating step ST1Ah, horizontal high-pass filter processing is performed to generate an image D1Ah by extracting horizontal high-frequency components from the input image DIN.

In the vertical high-frequency component image generating step ST1Av, vertical high-pass filter processing is performed to generate an image D1Av by extracting vertical high-frequency components from the input image DIN.

In this way, high-frequency component image generating step ST1A generates an image D1A including image D1Ah and image D1Av from the input image DIN. This operation is equivalent to the operation performed by the high-frequency component image generating means 1A.

In the low-frequency component image generating step ST1B, the following processing is performed on image D1A.

In the horizontal low-frequency component image generating step ST1Bh, horizontal low-pass filter processing is performed to generate an image D1Bh by extracting horizontal low-frequency components from image D1Ah.

In the vertical low-frequency component image generating step ST1Bv, vertical low-pass filter processing is performed to generate an image D1Bv by extracting vertical low-frequency components from image D1Av.

In this way, the low-frequency component image generating step ST1B generates an image D1B including image D1Bh and image D1Bv from image D1A. This operation is equivalent to the operation performed by the low-frequency component image generating means 1B.

The intermediate image generating step ST1 operates as described above, using image D1Bh as an image D1$h$, using image D1Bv as an image D1$v$, and outputting an intermediate image D1 including image D1$h$ and image D1$v$. These operations are equivalent to the operations performed by the intermediate image generating means 1.

Next, the operation of the intermediate image processing step ST2 will be described with reference to the flowcharts in FIGS. 21 to 24.

In the non-linear processing step ST2A, the following processing is performed on intermediate image D1.

First, in the horizontal non-linear processing step ST2Ah, processing is performed according to the flowchart in FIG. 22 to generate an image D2Ah from image D1$h$. The processing according to the flowchart shown in FIG. 22 is as follows. The pixel values in image D1$h$ are checked for changes in the horizontal direction in zero-crossing decision step ST311$h$. A point where the pixel value changes from positive to negative or from negative to positive is identified as a zero-crossing point, and the pixels to the left and right of the zero-crossing point are reported to signal amplifying step ST312$h$. In signal amplifying step ST312$h$, the pixel values of the pixels reported as being to the left and right of the zero-crossing point are amplified in image D1$h$, which is then output as image D2Ah. That is, image D2Ah is generated in the non-linear processing step ST2Ah by performing on image D1$h$ the same processing as performed in the horizontal non-linear processing means 2Ah.

Next, in the vertical nonlinear processing step ST2Av, processing is performed according to the flowchart in FIG. 23 to generate an image D2Av from image D1$v$. The processing according to the flowchart shown in FIG. 23 is as follows. The pixel values in image D1$v$ are checked for changes in the vertical direction in zero-crossing decision step ST311$v$. A point where the pixel value changes from positive to negative or from negative to positive is identified as a zero-crossing point, and the pixels immediately above and below the zero-crossing point are reported to signal amplifying step ST312$v$. In signal amplifying step ST312$v$, the pixel values of the pixels reported as being immediately above and below the zero-crossing point are amplified in image D1$v$, which is then output as image D2Av. That is, image D2Av is generated in the non-linear processing step ST2Av by performing on image D1$v$ the same processing as performed in the vertical non-linear processing means 2Av.

The non-linear processing step ST2A operates as described above to generate an image D2A including images D2Ah and D2Av. The above operations are equivalent to the operations performed by the non-linear processing means 2A.

Next, in high-frequency component image generating step ST2B, the following processing is performed on image D2A.

First, an image D2Bh is generated by performing horizontal high-pass filter processing on image D2Ah in the horizontal high-frequency component image generating step ST2Bh.

The horizontal high-frequency component image generating step ST2Bh performs processing similar to that performed in the horizontal high-frequency component image generating means 2Bh.

Next, an image D2Bv is generated by performing vertical high-pass filter processing on image D2Av in the vertical high-frequency component image generating step ST2Bv. The vertical high-frequency component image generating step ST2Bv performs processing similar to that performed in the vertical high-frequency component image generating means 2Bv.

High-frequency component image generating step ST2B operates as described above to generate an image D2B including image D2Bh and image D2Bv. These operations are equivalent to the operations performed by the high-frequency component image generating means 2B.

Figure 24:
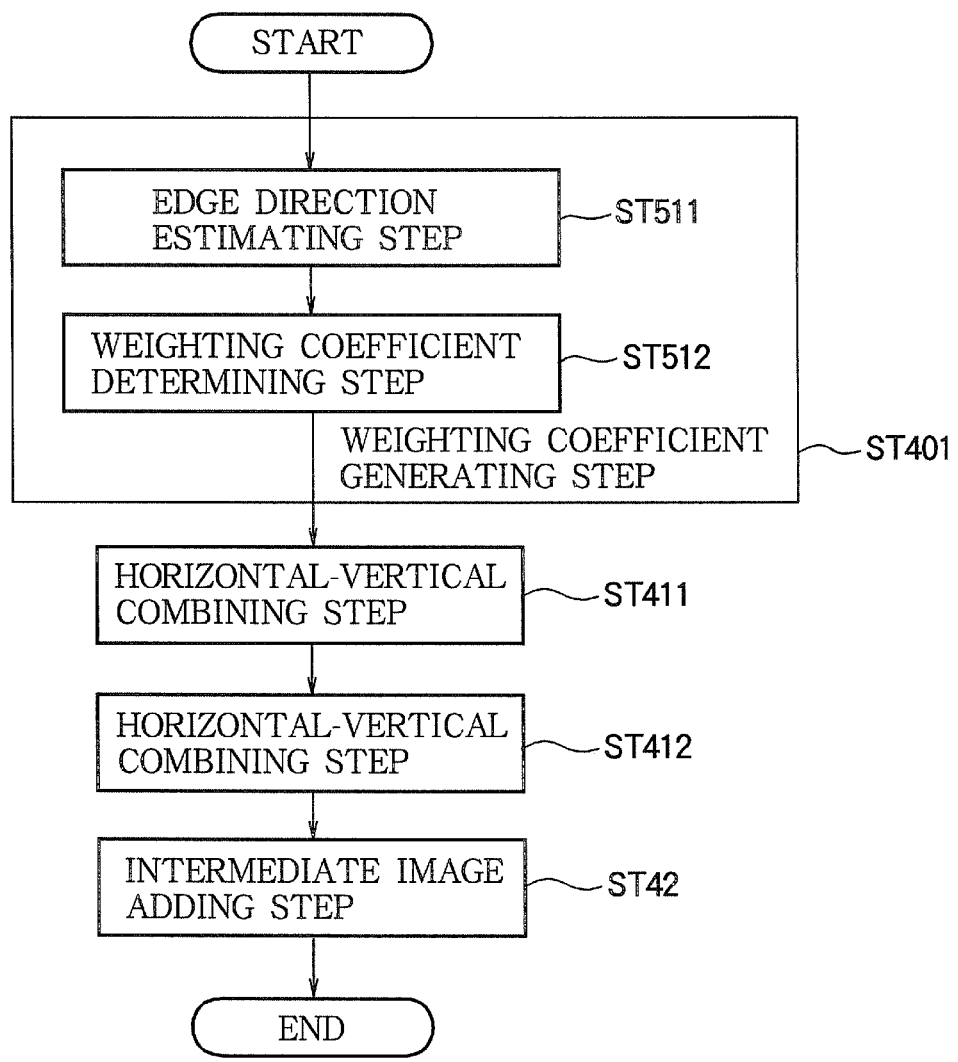
FIG. 24 is a flowchart illustrating processing in the adding step ST2C in FIG. 19.

Next, in adding step ST2C, processing is performed according to the flowchart in FIG. 24 to generate an image D2C by adding images D1h, D1v, D2Bh, and D2Bv. The processing in adding step ST2C is as follows.

First, the weighting coefficient generating step ST401 determines a horizontal component weighting coefficient D512h and a vertical component weighting coefficient D512v. The weighting coefficient generating step ST401 includes an edge direction estimating step ST511 and a weighting coefficient determining step ST512 that operate equivalently to the edge direction estimating means 511 and weighting coefficient determining means 512 in weighting coefficient generating means 401.

Next, horizontal-vertical combining step ST411 generates an image D1hv by performing weighted addition to combine images D1h and D1v pixel by pixel, using the weighting coefficients D512h and D512v obtained in the weighting coefficient generating step ST401. Horizontal-vertical combining step ST412 generates an image D2Bhv by similarly performing weighted addition to combine images D2Bh and D2Bv pixel by pixel, using weighting coefficients D512h and D512v.

Next, the intermediate image adding step ST42 adds images D1hv and D2Bhv. Images D1hv and D2Bhv may be added by weighted addition.

By operating as described above, adding step ST2C operates equivalently to adding means 2C.

The intermediate image processing step ST2 operates as described above to output image D2C as intermediate image D2. The operations performed are equivalent to the operation of the intermediate image processing means 2.

In adding step ST3, the input image DIN and intermediate image D2 are added together to generate the output image DOUT. The output image DOUT is output as a final output image by the image processing method in this invention. The operation performed in adding step ST3 is equivalent to the operation of adding means 3.

The image processing method in the third embodiment of the invention operates as described above.

As is clear from the description, the image processing method in the third embodiment of the invention and the image processing apparatus in the first embodiment operate equivalently. Therefore, the image processing method in the third embodiment has the same effects as the image processing apparatus in the first embodiment. If the image processing method described above is carried out in the image processing apparatus U2 in the image display apparatus shown in FIG. 6, for example, the image processed by the image processing method can be displayed by the monitor U3 shown in FIG. 6.

Fourth Embodiment

The image processing method according to a fourth embodiment determines the weighting coefficients used to combine images D2Bh and D2Bv in adding step ST2C in the image processing method in the third embodiment from images D2Bh and D2Bv.

Figure 25:
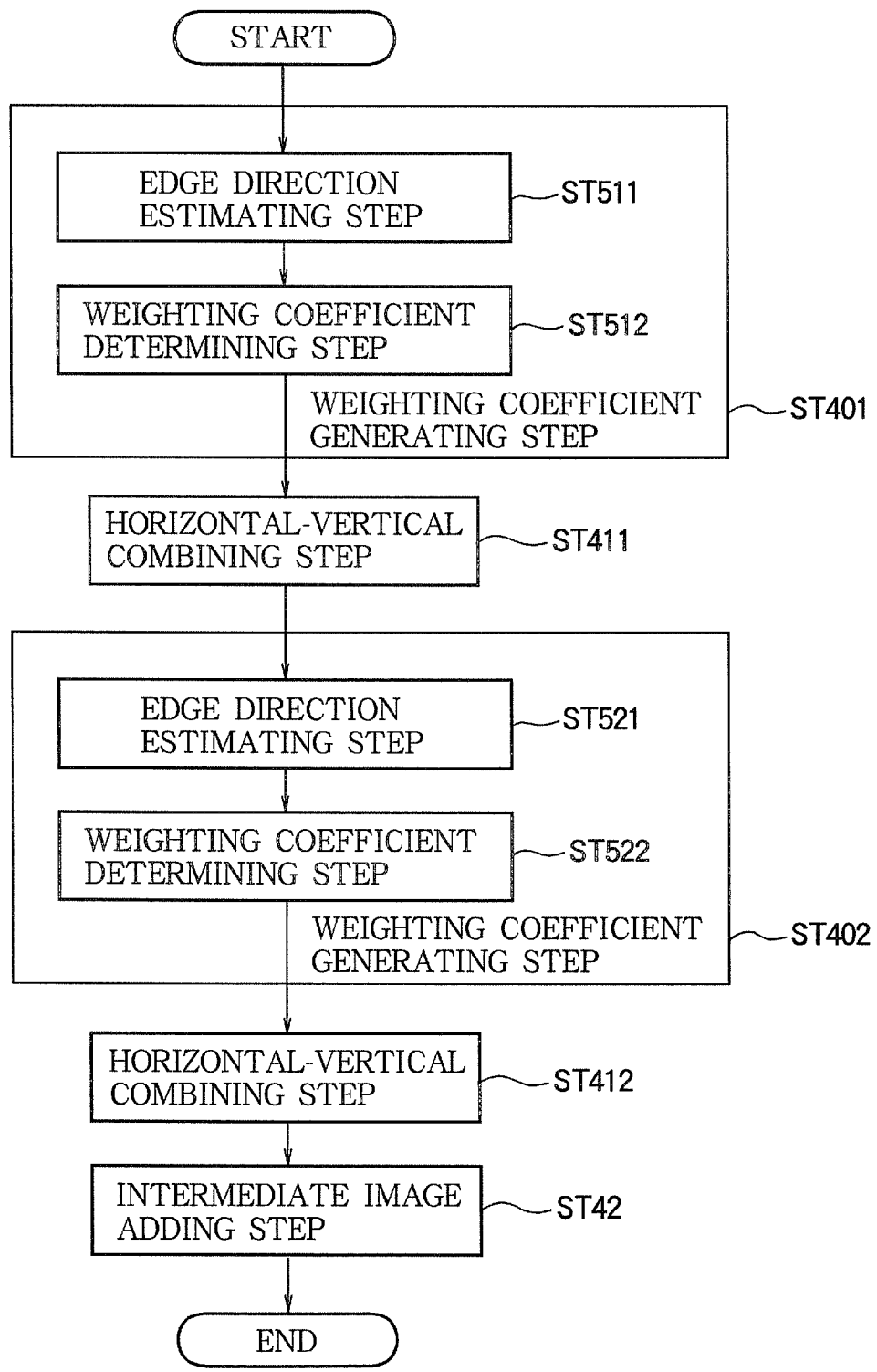
FIG. 25 is a flowchart illustrating processing in the adding step ST2C in a fourth embodiment of the invention.

FIG. 25 shows the flow of adding step ST2C in the image processing method according to the fourth embodiment of the invention. First in a weighting coefficient generating step ST401, a weighting coefficient D512h for image D1h and a weighting coefficient D512v for image D1v are determined from images D1h and D1v. The weighting coefficient generating step ST401 includes an edge direction estimating step ST511 and a weighting coefficient decision step ST512 that operate equivalently to the edge direction estimating means 511 and weighting coefficient determining means 512 in the weighting coefficient generating means 401.

Next, horizontal-vertical combining step ST411 uses the weighting coefficients D512h and D512v determined in the weighting coefficient generating step ST401 to perform weighted addition of images D1h and D1v, obtaining an image D1hv in which the horizontal component and vertical component are combined.

An additional weighting coefficient generating step ST402 determines a weighting coefficient D522h for image D2Bh and a weighting coefficient D522v for image D2Bv from image D2Bh and image D2Bv. Weighting coefficient generating step ST401 includes an edge direction estimating step ST521 and a weighting coefficient determining step ST522 that operate equivalently to the edge direction estimating means 521 and weighting coefficient determining means 522 in the weighting coefficient generating means 402 in the second embodiment.

Next, horizontal-vertical combining step ST412 performs weighted addition of image D2Bh and image D2Bv according to the weighting coefficients D522h and D522v obtained in weighting coefficient generating step ST402 to obtain an image D2Bhv in which the horizontal and vertical components are combined.

Next, an intermediate image adding step ST42 adds image D1hv and D2Bhv and outputs an image D2C.

By operating as described above, adding step ST2C operates equivalently to the adding means 2C in the second embodiment. Furthermore, the image processing method in the fourth embodiment of the invention and the image processing apparatus in the second embodiment of the invention operate equivalently. Accordingly, the image processing method in the fourth embodiment has the same effects as the image processing apparatus in the second embodiment. If the image processing method described above is implemented in the image processing apparatus U2 in the image display apparatus illustrated in FIG. 6, for example, an image processed by the image processing method described above can be displayed on the monitor U3 shown in FIG. 6.

EXPLANATION OF REFERENCE CHARACTERS 1 intermediate image generating means, 1A high-frequency component image generating means, 1B low-frequency component image generating means, 2 intermediate image processing means, 2A non-linear processing means, 2B high-frequency component image generating means, 2C adding means, 3 adding means, 401, 402 weighting coefficient generating means, 411 first horizontal-vertical combining means, 412 second horizontal-vertical combining means, DIN input image, D1 first intermediate image, D1h first horizontal intermediate image, D1v first vertical intermediate image, D2 second intermediate image, D2Bh second horizontal intermediate image, D2Bv first vertical intermediate image, DOUT output image.

What is claimed is:

1. An image processing apparatus including an image processing circuit, said image processing circuit comprising:

an intermediate image generating unit configured to generate a first horizontal intermediate image by extracting a horizontal component in a particular frequency band in an input image and a first vertical intermediate image by extracting a vertical component in a particular frequency band in the input image;

an intermediate image processing unit configured to generate a second intermediate image from the first horizontal intermediate image and the first vertical intermediate image; and a first adding unit configured to add the input image and the second intermediate image; wherein the intermediate image processing unit comprises:

a horizontal zero-crossing point decision unit configured to identify a point where the pixel value in the first horizontal intermediate image changes from positive to negative or from negative to positive as a zero-crossing point; and a horizontal signal amplifying unit that generates a horizontal non-linearly processed image by amplifying the pixel value of each pixel in the vicinity of the zero-crossing point, among the pixels forming the first horizontal intermediate image, by an amplification factor greater than 1;

a horizontal high-frequency component image generating unit configured to generate a second horizontal intermediate image by extracting only a high-frequency component in the horizontal non-linearly processed image;

a vertical zero-crossing point decision unit configured to identify a point where the pixel value in the first vertical intermediate image changes from positive to negative or from negative to positive as a zero-crossing point;

a vertical signal amplifying unit that generates a vertical non-linearly processed image by amplifying the pixel value of each pixel in the vicinity of the zero-crossing point, among the pixels forming the first vertical intermediate image, by an amplification factor greater than 1;

a vertical high-frequency component image generating unit configured to generate a second vertical intermediate image by extracting only a high-frequency component in the vertical non-linearly processed image; and a second adding unit configured to add the first horizontal intermediate image, the first vertical intermediate image, the second horizontal intermediate image, and the second vertical intermediate image, and to output a resulting sum as the second intermediate image; and wherein the second adding unit comprises at least one of a first horizontal-vertical combining unit configured to take a weighted sum of the first horizontal intermediate image and the first vertical intermediate image, and a second horizontal-vertical combining unit configured to take a weighted sum of the second horizontal intermediate image and the second vertical intermediate image.

2. The image processing apparatus of claim 1, wherein the second adding unit further comprises a first weighting coefficient generating unit configured to determine a first weighting coefficient from the first horizontal intermediate image and the first vertical intermediate image, and at least one of the first horizontal-vertical combining unit and the second horizontal-vertical combining unit uses the first weighting coefficient in taking the weighted sum.

3. The image processing apparatus of claim 2, wherein the first weighting coefficient generating unit comprises:

a first edge direction estimating unit configured to determine an edge direction estimation quantity corresponding to an edge direction in the input image from the first horizontal intermediate image and the first vertical intermediate image; and a first weighting coefficient determining unit configured to determine the first weighting coefficient from the first edge direction estimation quantity.

4. The image processing apparatus of claim 3, wherein the first edge direction estimating unit outputs a difference between absolute values of pixels in the first horizontal intermediate image and the first vertical intermediate image as the first edge direction estimation quantity.

5. The image processing apparatus of claim 4, wherein the first weighting coefficient determining unit:

determines a weighting coefficient for the first horizontal intermediate image from a characteristic that increases monotonically with respect to the first edge direction estimation quantity; and determines a weighting coefficient for the first vertical intermediate image from a characteristic that decreases monotonically with respect to the first edge direction estimation quantity; and wherein the sum of the weighting coefficient for the first horizontal intermediate image and the weighting coefficient for the first vertical intermediate image satisfies a relationship of always remaining constant.

6. The image processing apparatus of claim 2, wherein the second adding unit further comprises:

a second weighting coefficient generating unit configured to determine a second weighting coefficient based on the second horizontal intermediate image and the second vertical intermediate image; and wherein the first horizontal-vertical combining unit uses the first weighting coefficient in taking the weighted sum, and the second horizontal-vertical combining unit uses the second weighting coefficient in taking the weighted sum.

7. The image processing apparatus of claim 6, wherein the second weighting coefficient generating unit comprises:

a second edge direction estimating unit configured to determine an edge direction estimation quantity corresponding to an edge direction in the input image, based on the second horizontal intermediate image and the second vertical intermediate image; and a second weighting coefficient determining unit configured to determine the second weighting coefficient from the second edge direction estimation quantity.

8. The image processing apparatus of claim 7, wherein the second edge direction estimating unit outputs a difference between absolute values of pixels in the second horizontal intermediate image and the second vertical intermediate image.

9. The image processing apparatus of claim 8, wherein the second weighting coefficient determining unit:

determines a weighting coefficient for the second horizontal intermediate image from a characteristic that increases monotonically with respect to the second edge direction estimation quantity; and determines a weighting coefficient for the second vertical intermediate image from a characteristic that decreases monotonically with respect to the second edge direction estimation quantity; and wherein the sum of the weighting coefficient for the second horizontal intermediate image and the weighting coefficient for the second vertical intermediate image satisfies a relationship of always remaining constant.

10. The image processing apparatus of claim 1, wherein the intermediate image generating unit comprises:

a first horizontal high-frequency component image generating unit configured to generate a first horizontal high-frequency component image by extracting a high-frequency component equal to or greater than a first prescribed horizontal frequency by using pixels in a horizontal vicinity of each pixel in the input image;

a first vertical high-frequency component image generating unit configured to generate a first vertical high-frequency component image by extracting a high-frequency component equal to or greater than a first prescribed vertical frequency by using pixels in a vertical vicinity of each pixel in the input image;

a first horizontal low-frequency component image generating unit configured to generate the first horizontal intermediate image by extracting only a low-frequency component equal to or less than a second prescribed horizontal frequency in the first horizontal high-frequency component image; and a first vertical low-frequency component image generating unit configured to generate the first vertical intermediate image by extracting only a low-frequency component equal to or less than a second prescribed vertical frequency in the first vertical high-frequency component image.

11. The image processing apparatus of claim 10, wherein:

the second horizontal high-frequency component image generating unit generates the second intermediate image by extracting only the high-frequency component equal to or greater than a third prescribed horizontal frequency by using pixels in the horizontal vicinity of each pixel in the horizontal non-linearly processed image, and the second vertical high-frequency component image generating unit generates the second vertical intermediate image by extracting only the high-frequency component equal to or higher than a third prescribed vertical frequency by using pixels in the vertical vicinity of each pixel in the vertical non-linearly processed image.

12. An image display apparatus comprising the image processing apparatus of claim 1.

13. A method for processing an image by utilizing an image processing circuit, the method comprising:

an intermediate image generating step of generating, by utilizing an intermediate image generating unit included in said image processing circuit, a first horizontal intermediate image by extracting a horizontal component in a particular frequency band in an input image and a first vertical intermediate image by extracting a vertical component in a particular frequency band in the input image;

an intermediate image processing step of generating, by utilizing an intermediate image processing unit included in said image processing circuit, a second intermediate image from the first horizontal intermediate image and the first vertical intermediate image; and a first adding step of adding the input image and the second intermediate image; wherein the intermediate image processing step comprises:

horizontal zero-crossing point decision step configured to identify a point where the pixel value in the first horizontal intermediate image changes from positive to negative or from negative to positive as a zero-crossing point; and a horizontal signal amplifying step that generates a horizontal non-linearly processed image by amplifying the pixel value of each pixel in the vicinity of the zero-crossing point, among the pixels forming the first horizontal intermediate image, by an amplification factor greater than 1;

a horizontal high-frequency component image generating step configured to generate a second horizontal intermediate image by extracting only a high-frequency component in the horizontal non-linearly processed image;

a vertical zero-crossing point decision step configured to identify a point where the pixel value in the first vertical intermediate image changes from positive to negative or from negative to positive as a zero-crossing point;

a vertical signal amplifying step that generates a vertical non-linearly processed image by amplifying the pixel value of each pixel in the vicinity of the zero-crossing point, among the pixels forming the first vertical intermediate image, by an amplification factor greater than 1;

a vertical high-frequency component image generating step configured to generate a second vertical intermediate image by extracting only a high-frequency component in the vertical non-linearly processed image; and a second adding step of adding the first horizontal intermediate image, the first vertical intermediate image, the second horizontal intermediate image, and the second vertical intermediate image, and outputting a resulting sum as the second intermediate image; and wherein the second adding step includes at least one of a first horizontal-vertical combining step of taking a weighted sum of the first horizontal intermediate image and the first vertical intermediate image, and a second horizontal-vertical combining step of taking a weighted sum of the second horizontal intermediate image and the second vertical intermediate image.

* * * * *